US012509625B2

(12) United States Patent
Agrawal et al.

(10) Patent No.: US 12,509,625 B2
(45) Date of Patent: Dec. 30, 2025

(54) ELECTROCHROMIC DEVICES USING NON-HALOGENATED ANIONS

(71) Applicant: Polyceed Inc., Tucson, AZ (US)

(72) Inventors: Anoop Agrawal, Tucson, AZ (US); John Cronin, Tucson, AZ (US); Lori Adams, Oro Valley, AZ (US); Sahila Perananthan, Tucson, AZ (US)

(73) Assignee: Polyceed Inc., Tucson, AZ (US)

( * ) Notice: Subject to any disclaimer, the term of this patent is extended or adjusted under 35 U.S.C. 154(b) by 492 days.

(21) Appl. No.: 17/937,521

(22) Filed: Oct. 3, 2022

(65) Prior Publication Data

US 2023/0043340 A1 Feb. 9, 2023

Related U.S. Application Data

(63) Continuation-in-part of application No. 17/587,630, filed on Jan. 28, 2022, which is a continuation-in-part of application No. PCT/US2020/043722, filed on Jul. 27, 2020.

(60) Provisional application No. 63/013,120, filed on Apr. 21, 2020, provisional application No. 62/988,101, filed on Mar. 11, 2020, provisional application No. 62/880,241, filed on Jul. 30, 2019.

(51) Int. Cl.
*C09K 9/02* (2006.01)
*G02F 1/1516* (2019.01)
*G02F 1/1523* (2019.01)

(52) U.S. Cl.
CPC .............. *C09K 9/02* (2013.01); *G02F 1/1516* (2019.01); *G02F 1/1525* (2013.01)

(58) Field of Classification Search
CPC .................................................... G02F 1/1516
See application file for complete search history.

(56) References Cited

U.S. PATENT DOCUMENTS

| 4,088,497 | A | 5/1978 | Brown et al. |
|---|---|---|---|
| 6,002,511 | A | 12/1999 | Varaprasad et al. |
| 6,020,987 | A | 2/2000 | Baumann et al. |
| 6,178,034 | B1 | 1/2001 | Allemand et al. |
| 6,437,901 | B1 | 8/2002 | Kobayashi et al. |
| 6,767,481 | B2 | 7/2004 | Berneth et al. |
| 7,463,400 | B1 * | 12/2008 | Tatsuura ............... G02F 1/1516 359/273 |
| 7,855,821 | B2 | 12/2010 | Baumann |

(Continued)

FOREIGN PATENT DOCUMENTS

| EP | 0403044 A2 | 12/1990 |
|---|---|---|
| WO | 2018128906 A1 | 7/2018 |

OTHER PUBLICATIONS

International Preliminary Report on Patentability issued in PCT/US2020/043722 dated Feb. 1, 2022, 8 pgs.

(Continued)

*Primary Examiner* — Peter F Godenschwager
(74) *Attorney, Agent, or Firm* — Rothwell, Figg, Ernst & Manbeck, P.C.

(57) ABSTRACT

This disclosure provides compositions of electrochromic dyes, functionalized electrochromic dyes and dye macromers which may be incorporated into electrochromic devices with tailored optical properties. The disclosure provides electrochromic devices and electrochromic materials which do not use halogenated anions. This disclosure also provides EC compositions and devices for controlling color.

26 Claims, 14 Drawing Sheets

(56) References Cited

U.S. PATENT DOCUMENTS

| | | |
|---|---|---|
| 8,593,714 B2 | 11/2013 | Agrawal et al. |
| 8,947,758 B2 | 2/2015 | Agrawal |
| 9,738,140 B2 | 8/2017 | Ash et al. |
| 11,194,210 B2 | 12/2021 | Ash et al. |
| 2002/0012155 A1 | 1/2002 | Baumann et al. |
| 2012/0206790 A1 | 8/2012 | Varaprasad et al. |
| 2017/0355901 A1 | 12/2017 | Branda et al. |
| 2019/0145161 A1 | 5/2019 | Agrawal et al. |
| 2019/0235339 A1 | 8/2019 | Cronin et al. |
| 2020/0019032 A1 | 1/2020 | Agrawal et al. |

OTHER PUBLICATIONS

International Search report and Written Opinion in PCT/US2020/043722 dated Oct. 21, 2020, 14 pgs.

Chen et al., "Determination and Correlation of Solubilities of Lithium Bis(oxalate)borate in Six Different Solvents from (293.15 to 363.15) K", Journal of Chemical & Engineering Data, 2014, 59, pp. 1614-1618.

Fan et al., "Studies on lithium bis(oxalato)-borate/propylene carbonate-based electrolytes for Li-ion batteries", Ionics (2011) 17: pp. 491-494.

Cheryl Hogue, "How to define PFAS, The US EPA's approach to this category of chemicals is narrower than an international one", Chemical & Engineering News, Jul. 1, 2022, vol. 100, issue 24, 5 pgs.

Eggesse et al., "Oxidative Decomposition of Propylene Carbonate in Lithium Ion Batteries: A DFT Study", The Journal of Physical Chemistry, 2013, vol. 117, pp. 7959-7969.

Xin, N., Sun, Y., He, M., Radke, CJ, & Prausnitz, JM. (2018). Solubilities of six lithium salts in five non-aqueous solvents and in a few of their binary mixtures. UC Berkeley. http://dx.doi.org/10.1016/j.fluid.2017.12.034 Retrieved from https://escholarship.org/uc/item/79h5j8w5, 7 pgs.

* cited by examiner

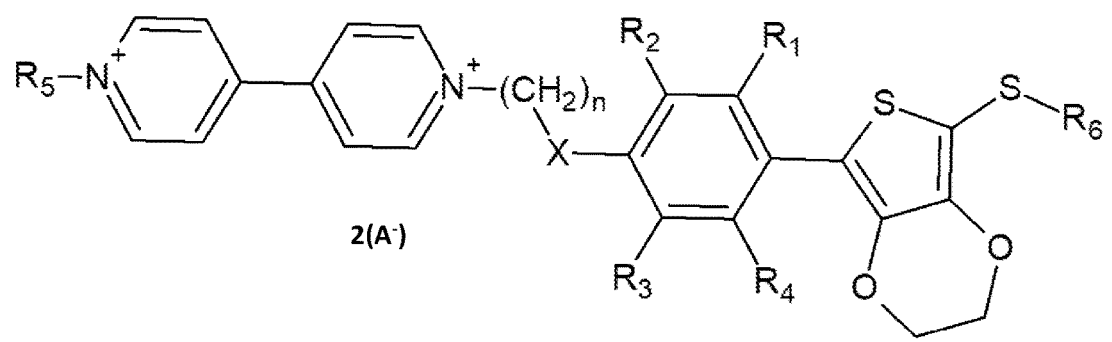
Figure 5
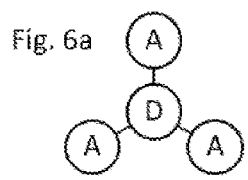
Fig. 6a
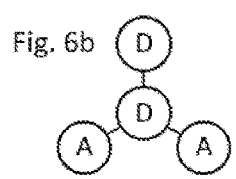
Fig. 6b
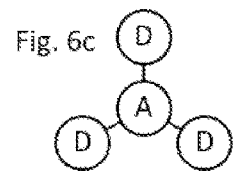
Fig. 6c
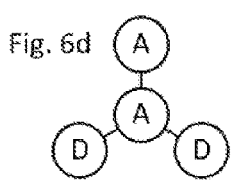
Fig. 6d
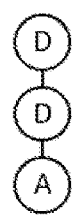
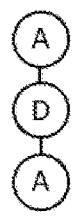
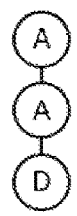
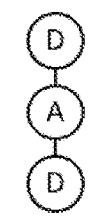
Fig. 6e   Fig. 6f   Fig. 6g   Fig. 6h
Fig. 6i   Fig. 6j   Fig. 6k   Fig. 6l

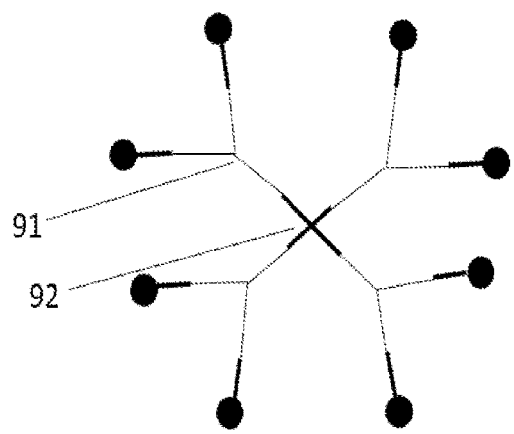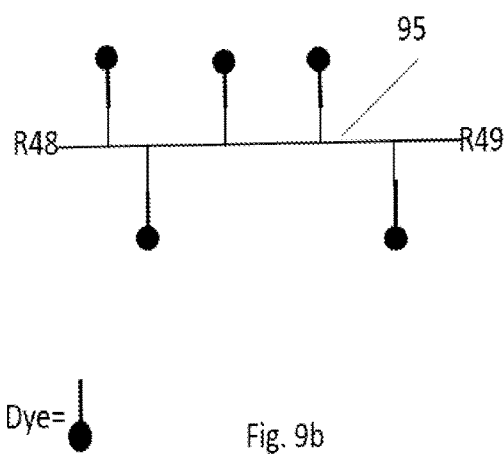
Fig. 9a
Functionalized Dye=●
Fig. 9b

ELECTROCHROMIC DEVICES USING NON-HALOGENATED ANIONS

CROSS-REFERENCE TO RELATED APPLICATIONS

This application is a continuation-in-part of U.S. application Ser. No. 17/587,630, filed on Jan. 28, 2022, which is a continuation-in-part of PCT/US2020/043722, filed Jul. 27, 2020, which claims priority benefit of U.S. application Ser. No. 62/880,241, filed on Jul. 30, 2019; 62/988,101, filed Mar. 11, 2020 and 63/013,120 filed Apr. 21, 2020, the disclosures of which are incorporated herein by reference in their entireties.

FIELD OF THE INVENTION

The present invention relates to electrochromic dye materials, method of making these materials and incorporating them into devices, such devices may be used in windows for buildings and transportation, mirrors, displays and optical filters. In particular, the present disclosure includes EC materials and devices which do not use halogenated anions.

BACKGROUND OF INVENTION

Electrochromic (EC) devices are electrooptical devices which change color and/or transparency when an electrical voltage is applied. Such devices are used in windows of building and in transportation vehicles (e.g., automobiles, trucks, buses, planes, trains, boats, ships, watercraft, aircraft, pods, helicopters, etc.). These devices may be made using rigid substrates or flexible substrates wherein the latter may also be bonded to existing windows for retrofit applications or laminated within rigid substrates. The devices incorporating materials of this invention may also be used for self-dimming automotive mirrors, variable transmission optical filters and in displays. EC devices comprise several layers of electrodes and electrolyte deposited on a substrate, or the electrode layers are deposited on two different substrates and assembled with the layers facing inwards with an ion-conductive (i.e., an electrolyte) layer. Published US patent application 20190145161 and U.S. Pat. No. 8,593,714 teach novel EC devices where at least one of the electrode layers contains an EC dye material that is attached to a polymeric matrix. There are other types of EC devices where the EC dye materials are present in the electrolyte, for example those discussed in U.S. Pat. Nos. 8,947,758, 6,178,034 and 6,002,511. All references discussed in the present disclosure are incorporated by reference in their entireties for all purposes.

SUMMARY OF INVENTION

One objective of this invention is to provide modified EC dye materials which may be incorporated in the EC devices. Another objective is to achieve this incorporation by functionalizing the dye molecules with specific links which contain reactive groups. Functionalized dye molecules are incorporated in monomeric formulations for depositing the layers in an EC device so that upon polymerization these functionalized dyes are covalently attached to the polymeric matrix (coating matrix) through the reactive end of the links. Another objective is to make large dye molecules (dye macromers) which may be incorporated in these polymer matrices so that they are unable to diffuse out of the layer they are in. These may be physically trapped in the layer they are in or are covalently bonded. Another objective is to disclose specific types of bridged EC dyes (or more than EC dye moieties combined in a single molecule) which provide high durability against the solar radiation and have high durability to electrochemical cycling.

In a further aspect of this invention EC materials and devices with color control are disclosed, with a particular focus on more neutral colors in the colored state.

In one aspect, the present disclosure provides an electrochromic device having two electrically conductive coatings deposited on two clear substrates and at least one of which is transparent, and the device contains an electrolyte between the two conductors wherein the said electrolyte has at least one bridged EC dye and at least one additional EC dye which is not bridged and has anodic or cathodic characteristics.

In one aspect, the present disclosure provides an electrochromic device having two electrically conductive coatings deposited on two clear substrates and at least one of which is transparent, and the device contains an electrolyte between the two conductors wherein the said electrolyte has at least the following combination of the dyes: a viologen; a phenazine and a phenothiazine according to the present disclosure.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

BRIEF DESCRIPTION OF FIGURES

FIG. 5 illustrates exemplary bridged dye;

FIGS. 6a-6l schematically illustrate bridged dyes having Donor-Acceptor combinations;

FIGS. 9a and 9b illustrate schematics of several EC dye macromers;

DETAILED DESCRIPTION

Figure 1:
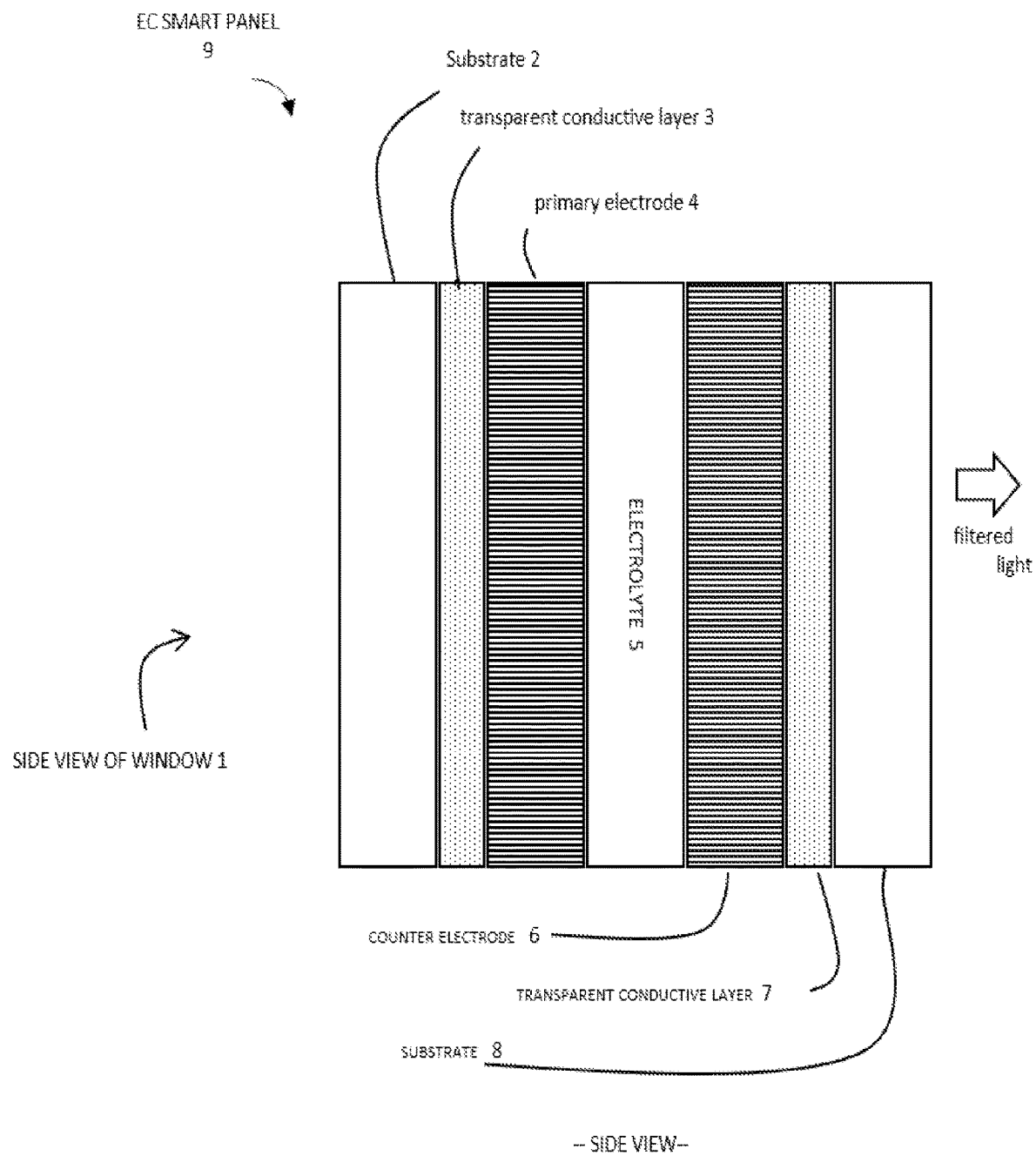
FIG. 1 illustrates an EC panel for use in a window, e.g., in a building window.

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

The singular forms "a," "an," and "the" include plural referents unless the context clearly dictates otherwise.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value.

Generally, herein the term "or" includes "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "parallel" refers to elements that are parallel to within 10 degrees.

Furthermore, certain compositions, injuries or conditions, steps, or the like may be discussed in the context of one specific embodiment or aspect. It is understood that this is merely for convenience, and such disclosure is equally applicable to other embodiments and aspects found herein.

EC Device Structures and their Fabrication

FIG. 1 illustrates a side view of an electrochromic panel 9 showing the device having a multi-layer structure. This side-view is configured with two opposing substrates 2, 8, having layers therebetween. For a window application, the substrates 2, 8 are transparent. In the illustrated example, both substrates 2, 8 have a Transparent Conductive (TC) layer 3, 7, respectively. Other layers include layers 4, 6, which are called primary EC electrode and counter electrodes, respectively. Between the electrodes 4, 6, is an ion-conducting material, which in this configuration is layer 5 (also called electrolyte). When coloring voltage is applied across the two opposing conductive layers 3 and 7, the electrodes 4 and 6 reversibly reduce and oxidize respectively. The potential difference causes lithium ions (Li+) to move out of counter electrode 6 and into the primary electrode 4; where this transportation of ions is conducted through the electrolyte layer. In this example, a primary electrode 4 is formed by an electrochromic (EC) material; and a counter electrode 6 may also be formed by an EC material, wherein the EC material of the counter electrode 6 has preferably complementary EC properties to those of the primary electrode 4.

Complementary EC property means that the counter electrode is also electrochromic and colors (or darkens) under an applied coloration potential due to oxidation while the primary electrode 4 also colors (or darkens) simultaneously upon reduction. That is, the electrochromic material (layer 4) undergoes a colorless to colored transition reductively, while the counterelectrode (layer 6) oxidatively undergoes a similar color transition, i.e., to a darker state. In this way, one realizes double the optical effect per electron transferred, since two materials change color to a more highly colored (darker) state simultaneously. This "complementary counterelectrode" technology is a preferred approach. Additionally, the preferred complementary electrodes (for layer 6) are those which transition to the colored state in different optical regions (i.e., have different colors in the visible spectrum or show color absorption peaks at different optical wavelengths as compared to the electrochromic material in layer 5). The dye containing electrodes may show multiple color absorption peaks due to the nature of the dye, or because this layer may have more than one dye so that the total device color is highly tunable and may have multiple absorption peaks.

For mirror applications one of the transparent conductors is replaced by a reflective layer or a reflective layer is placed on one of the outer surfaces of the substrates 2 and 8 (not shown).

The dye materials of this invention may also be used in other types of EC device constructions. For example, there may be EC devices where layers 4 and 6 are eliminated from FIG. 1, that is the electrolyte layer 5 is in contact with the conductive layers 3 and 7. In these devices the dye materials of the invention may be used in layer 5 (this type of device is more fully explained in FIG. 2c). In another type of EC device with reference to FIG. 1, layer 6 is not present and the electrolyte 5 is in contact with layer 7 and layer 4, and in these devices the dye materials of this invention may be present in at least one of the layers 4 and 5 (this type of device is more fully explained in FIG. 2b). In reference to FIG. 1, in yet another kind of device layer 6 is not present and layer 4 may be further coated with a selective ion conducting layer (not shown) which only allows a certain size of ions to pass through. The materials of this invention may be incorporated in at least one of the layers 4 and 5. Different EC device constructions that may be used and are described in detail in the references discussed earlier.

Figure 2A:
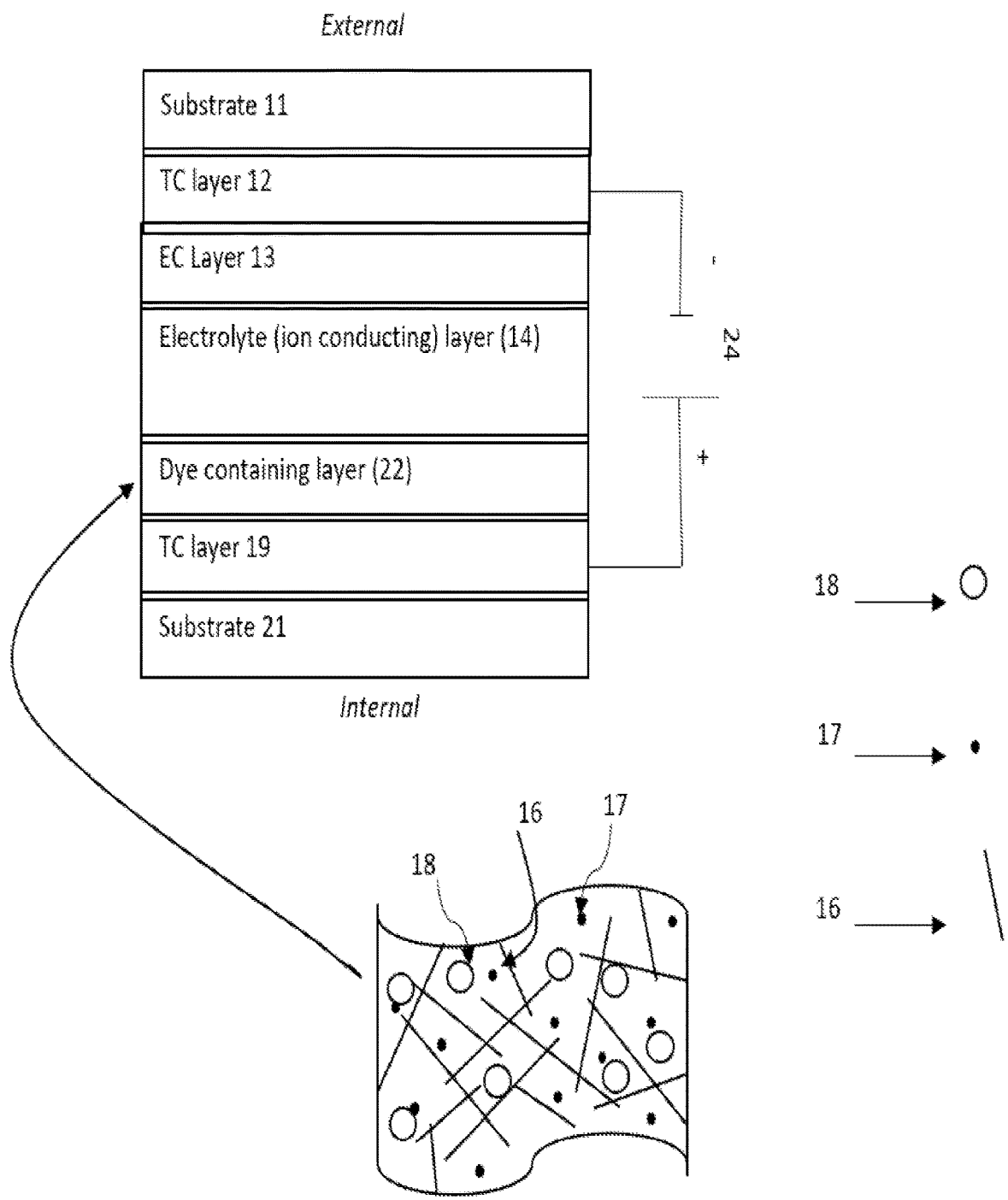
FIGS. 2a, 2b, and 2c illustrate specific electrochromic (EC) devices to elucidate specific embodiments of the present invention.
Figure 2B:
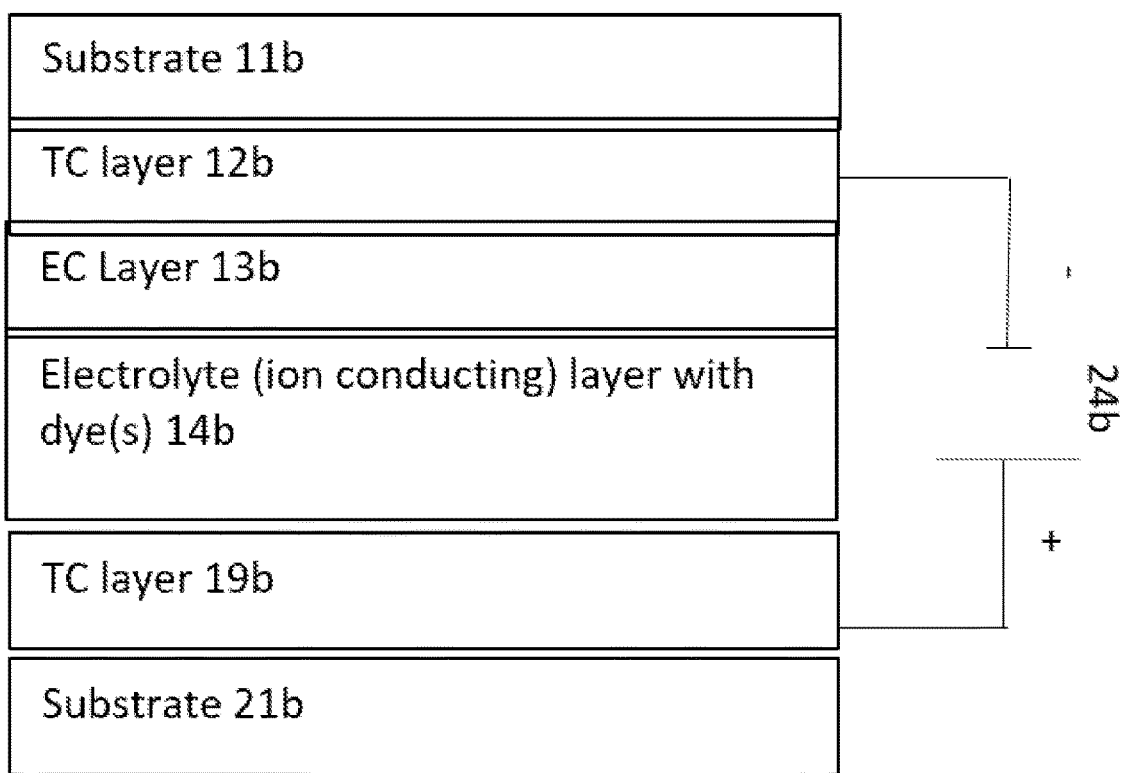
Figure 2C:
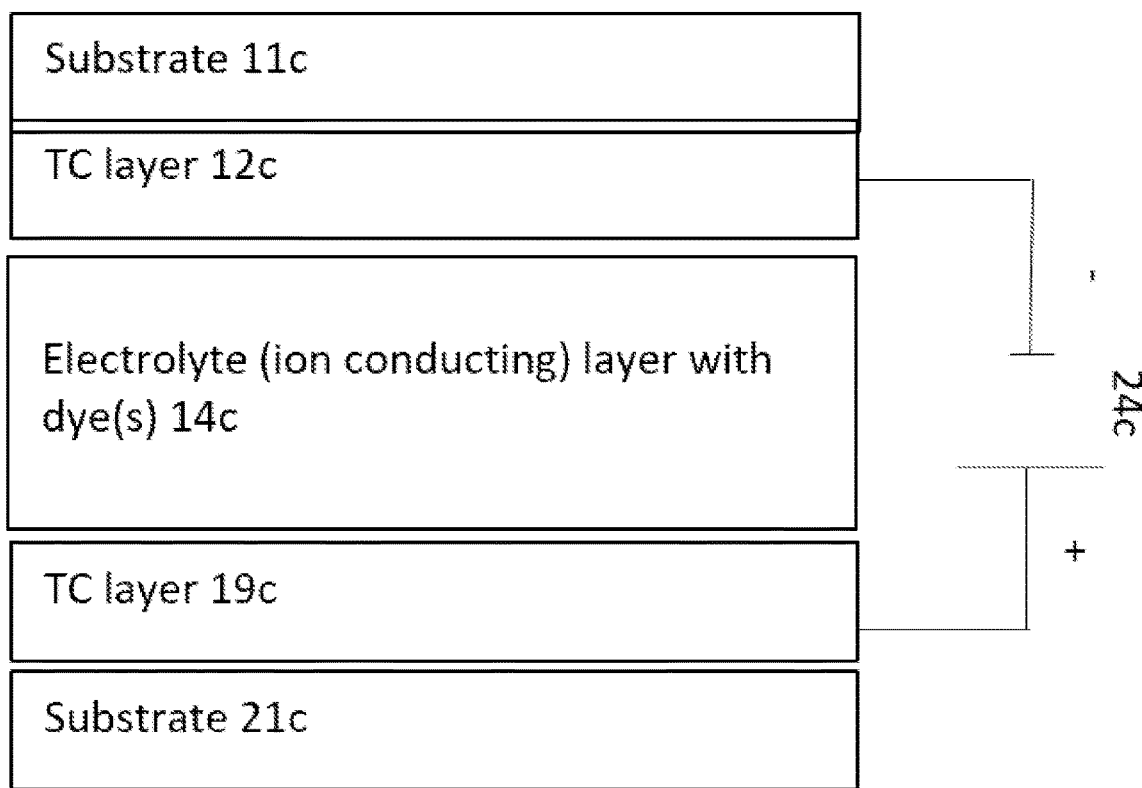
Figure 3A:
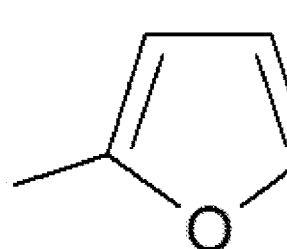
FIGS. 3(a)-3(g) show examples of "7c" connectors used for bridged EC dyes.
Figure 3B:
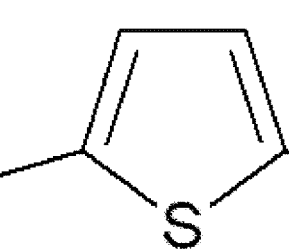
Figure 3C:
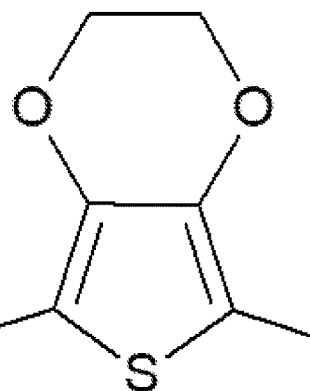
Figure 3D:
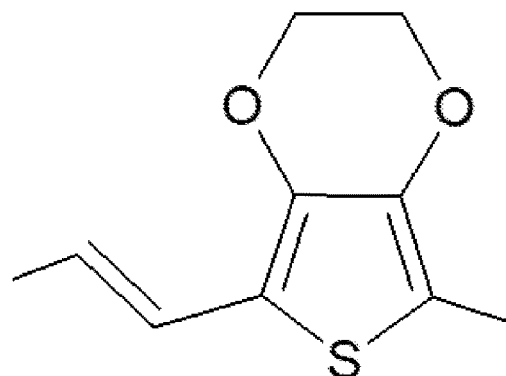
Figure 3E:
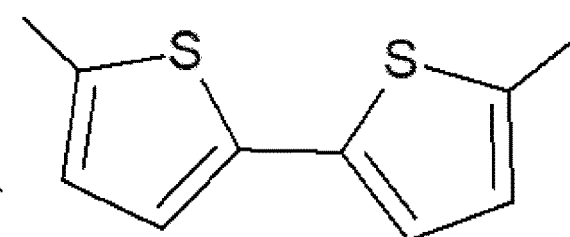
Figure 3F:
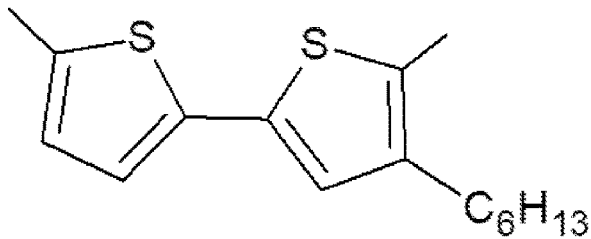
Figure 3G:
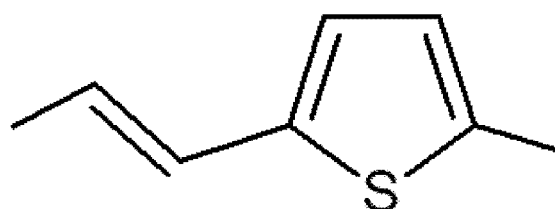

In the type of devices represented in FIG. 1, in one embodiment at least one of the layers 4 or 6 may also have electrically conductive nanoparticles which do not reduce or oxidize during electrochemical cycling of the devices. However, in all of the devices mentioned here, the electrolyte layer does not have electrically conductive particles, even if dyes are present in this layer. Some examples of these conductive particles are carbon nanotubes (CNT) in metallic phase, which means that the carbon atoms are arranged within these particles to give metal like conductivity along the length of the tubes (see published patent application US20190235339, which is incorporated herein by reference in its entirety, for a more extensive definition of metallic phase regarding carbon nanotubes). Other examples of conductive particles are metal oxides such as indium-tin oxide, fluorine doped tin oxide, aluminum doped zinc oxide, etc. Nanoparticles may have any shape spherical, ellipsoid, cuboid, fibrous, disc, etc., as long as at least one dimension (length, width, thickness, diameter, etc.) is smaller than 100 nm, and in another embodiment at least one dimension of these nanoparticles is smaller than 10 nm. For example, the nanoparticles may have a size in at least one dimension in a range of about 0.7 nm to about 100 nm, about 1 to about 75 nm, about 2 to about 80 nm, about 3 to about 60 nm, about 4 to about 50 nm, about 1 to about 20 nm, about 0.7 to about 10 nm, including any range within the disclosed ranges. As an example, one specific type of device following the principles of FIG. 1 is shown in FIG. 2, aspects of which device were discussed in US20190145161, which is incorporated herein by reference in its entirety. Since several concepts of the current invention will be explained in the context of FIGS. 1 and 2, additional details of FIGS. 2a, 2b and 2c are provided below.

Conductive nanoparticles are used to attain electronic conductivity in the layer with redox properties or form a conductive network (or a fractal arrangement) in this layer for transparent devices. These preferably should have low optical haze for windows used in building and transportation applications. However, it would be possible to use particles of larger size for those devices where higher haze is required for the application. In addition, larger particles and nanoparticles may also be mixed. The shapes of the nanoparticles and the larger particles used within the same layer may be the same or different. An implicit assumption is made that these particles will have a different refractive index as compared to the matrix they are in and hence the use of nanoparticles is important to reduce haze. However, if the conductive particles are of a refractive index (RI) that matches that of the polymeric matrix they are in, then these particles may be larger and will not produce haze. Typically, the haze for a layer which contains particles is dependent on the degree of RI mismatch (higher mismatch leads to greater haze), the particle size (larger particle size leads to more haze) and its loading (higher loading by weight gives more haze). A matched RI between the particles and the matrix generally should have a RI value difference of less than 0.02 units and in another embodiment this value should be less than 0.01 units and yet in another embodiment this value should be less than 0.005 units. All parameters being the same for a given layer composition, haze will increase with increasing layer thickness. For most conductive particles (discussed later) their refractive index varies from about 1.8 to about 3 in the visible region, and for most polymers the RI is between 1.4 to 1.7. This means that for most of these materials the index matching from an RI difference is large, thus one needs to use smaller nanoparticles with at least one dimension smaller than about 20 nm, and smaller loading so as not to exceed about 5% by weight based on the mass of the solidified coating. Since, eventually from an optical perspective, loading volumes are more important than loading mass, 2% by volume may be an upper range for highly dense conductive materials and in another embodiment the volume loading is 1% or lower and yet in another embodiment less than 0.5 volume %. These layers may have several other additives such as UV and thermal stabilizers, viscosity modifiers, surfactants, adhesion promoters, etc. to help with both durability and processing. Some examples of additives which are added into the electrolyte layer are plasticizers, dissociable salts, UV stabilizers, viscosity modifiers, adhesion promoters, polymerization catalysts/initiators, etc. Although all of these additives or only some of these may be used in the system. Although the above-mentioned additives should be inert, meaning they should not interfere with the electrochromic (or electrochemical) activity, sometimes they do and that needs to be checked that they do not cause durability to decrease. For example, a certain type of salt or a UV stabilizer might interact in undesirable ways, but a different UV stabilizer and/or salt may not interfere. Furthermore, this interaction will also be dependent on the electrochromic material selected.

FIG. 2a shows that substrates 11 and 21 are each coated with at least two layers, i.e., the transparent conductor (TC) layer (12) and the EC layer 13 are sequentially coated on substrate 11 and dye containing polymer layer 22 is coated on the TC layer 19 which itself is deposited on substrate 21. These are assembled together by sandwiching an electrolyte layer 14 between layers 13 and 22 as shown in FIG. 2a. The TC layer 19 along with the anodic layer 22 acts as a counter electrode to the cathodic EC layer 13 in contact with TC 12, and the two TC layers are connected electronically through an external circuit containing the power source 24. Cathodic EC layer 13, may have similar composition as layer 22 but must have a dye with cathodic properties when the layer 22 has a dye with anodic properties. Anodic materials are those that are oxidizable, for example anodic electrochromic materials color (or change color) when oxidized. Cathodic materials are those which are reducible, for example cathodic electrochromic materials color (or change color) when reduced. Electrochromic anodic and cathodic materials may be certain dyes (ferrocene, phenothiazine and phenazines are anodic, viologens are cathodic), certain metal oxides (tungsten oxide is cathodic, nickel oxide is anodic), and also certain polymers (e.g., polyaniline is anodic, poly (3,4-ethylenedioxythiophene is cathodic). Typically Poly aniline and poly(3,4-ethylenedioxythiophene have been used as electrochromic coatings in the EC devices.

FIG. 2b shows that substrates 11b and 21b are each coated with a transparent conductive (TC) layers 12b and 19b, and an EC layer 13b is further coated on substrate 12b. These are assembled by sandwiching an electrolyte layer 14b between layers 13b and the TC layer 19b as shown in FIG. 2b. The TC layer 19b is deposited on the substrate 21b. The electrolyte layer may be a liquid or a solid. Alternatively, these are assembled by sealing the perimeter and leaving an empty cavity between the two where the TCs face each other in the cavity and the cavity is later filled with a liquid electrolyte through a hole in the substrate or the sealant. The liquid may be converted to solid later by polymerizing/crosslinking monomers present in the liquid. The two TC layers are connected electronically through an external circuit containing the power source 24b. The EC layer 13b may have similar composition as layer 13 or 22 as described for FIG. 2a. If this layer is cathodic (i.e., colors upon reduction), then the electrolyte will have at least one anodic dye (will color upon oxidation to form the redox pair), although it may also have additional anodic, cathodic or bridged dyes(s). If this layer is anodic (i.e., colors upon oxidation, then the electrolyte will have at least one cathodic dye (i.e., it colors upon reduction, again to form a redox pair, and additional cathodic, anodic or bridged dyes may be present). In some devices only an anodic or the cathodic material that forms the redox pair may be electrochromic.

FIG. 2c shows that substrates 11c and 21c are each coated with transparent conductors (TC) layers (12c and 19c) respectively. These coated substrates are assembled by sandwiching an electrolyte layer 14c between layers 12c and 19c. The electrolyte will have at least one anodic dye and at least one cathodic dye, unless the dye is bridged and has both anodic and cathodic moieties that are covalently attached. They may have additional anodic, cathodic and bridged dyes. The two TC layers are connected electronically through an external circuit containing the power source 24c. The EC devices in FIGS. 2b and 2c have been used to make automotive mirrors, wherein at least one of the transparent conductors may be optionally replaced by a conductive reflective layer or multiple layers which provide both conductivity and reflectivity. In that case the color discussions and claims in this document from the selection of electrochromic materials relate to the reflected light.

In devices of FIGS. 2a, 2b and 2c, often more than two dyes are used, where each electrochromic material colors in a different spectral region to tune a desired color (in the region of 400 to 700 nm), particularly if the device colors to a neutral color. Additional dyes may be used that color in the near-infra-red region (~700 to 2,000 nm), or some of the dyes may exhibit color in both the visible and the NIR region. Thus, based on this disclosure, one skilled in the art can tune specific colors in the visible region while also coloring or reducing the transmission in the NIR region.

In FIG. 2a, if a bridged dye with anodic and cathodic properties is used, then the composition of the two layers (13 and 22) may be substantially similar. In some embodiments, the cathodic EC layer 13 contains tungsten oxide, wherein, as used in this disclosure, tungsten oxide is generally written as WOx without a fixed W:O stoichiometry, and includes doped tungsten oxide, such as is doped with one or more other metal oxides. The dopants to the tungsten oxide may include one or more of metal oxides, such as alkali metal oxides (e.g., lithium oxide, sodium oxide, and potassium oxide), nickel oxide, titanium oxide, vanadium oxide copper oxide, cobalt oxide, chromium oxide, niobium oxide and molybdenum oxide. The concentration of the alkali metal atoms (as oxides) is in a range of about 5 to 40% (molar concentration based on the tungsten oxide moles), while the others are usually less than 15 molar % based on tungsten moles in tungsten oxide. In another embodiment the concentration of alkali metal oxides is from 8 to 40 molar % and for other materials between 0.1 to 10 molar %, all based on the moles of tungsten oxide (or tungsten moles). The tungsten oxide material is coated on top of a transparent conducting layer, TC layer 12, which is present on substrate 11. In some respects, these layers are monolithic coatings. They may also comprise nanoparticles of oxide EC materials along with conductive nanoparticles, but any such layers must meet strict optical properties for windows use as discussed below. Tungsten oxide (with or without these additives) exhibit cathodic coloration, which means that they darken, or color, upon reduction, which is upon injection of ions (e.g., protons, lithium, sodium, potassium, and so forth) and as many electrons to keep the charge neutrality, also referred to as ion intercalation.

If anodic inorganic EC layers are used for EC layer 13 then dyes with cathodic characteristics are used in layer 22. There are several inorganic material choices for anodic layers such as nickel oxide, iridium oxide and vanadium oxide. These may be mixed with each other, or they are doped. Although a variety of metal oxides may be used as dopants, some of the dopants in nickel oxide are lithium oxide, cobalt oxide and tungsten oxide, where typically the dopants are about 5-35 mole % of nickel oxide. A dopant for iridium oxide may be tin oxide. The thickness of the EC inorganic oxides (cathodic or anodic) may be in the range of about 150 nm to about 1,000 nm).

The dye-containing redox layer 22 (or layer 13 if similarly constructed with dyes) has both electrolytic properties (ion-conductive properties) and electrically conductive properties. In some respects, the thickness of this layer may be about 1 μm to 100 μm as mentioned above. The dye molecules are prevented from being transported to an adjacent layer (e.g., the electrolyte layer 14) by trapping them physically in the polymer matrix of the layer or tethering them covalently to the polymeric matrix. Therefore, the redox dye molecules (which are typically not electronically conductive) when immobilized in layer 22 should be oxidized throughout the bulk of this layer without having them physically transported onto the surface of the transparent conductor 19. This is achieved by the percolated network of the conductive nanoparticles particles which carry the electrons from the dyes to the TC layer. Not shown in this figure are the use of any other optional layers such as use of adhesion promotion layers at the interfaces of one or more of these layers, use of anti-iridescent layers, UV blocking layers, etc., as long as these optional layers do not interfere with electronic and ionic functioning of the device.

The dye containing layer includes electronically conductive nanoparticles 16 and dye molecules 18. The dye molecules are principally tied physically (trapped) or chemically (covalently bonded) to the polymeric network, and in another embodiment, these may be tied to the conductive nanoparticles present in this layer. The ion-conducting layer 14, or electrolyte layer, is proximate to the dye containing layer 22 and the dye containing layer includes dissociable salts (e.g., lithium salts), which are shown as Lithium ions 17, $Li^+$. In some respects, the same dissociable salts may also be present in the layer 22. Anions of the lithium salt or of the dye (if the dye has a salt structure and has anions) are not shown. The electronically conductive nanostructures 16 present in dye containing layer may be nanotubes (e.g., carbon nanotubes, i.e., CNTs), nanorods (e.g., electrochemically stable metal wires (e.g., gold and alloys of gold) or whiskers), nano-discs (e.g., graphene), spherical or other shaped nanoparticles (e.g., indium tin oxide; antimony doped tin oxide and aluminum doped zinc oxide) and so forth and more than one type of conductive particles may be added in the layer, such as CNTs and graphene. As discussed above larger conductive particles may also be added. The conductive nanoparticles in this layer are present at least in a concentration sufficient to achieve percolation threshold and typically do not have any inherent electrochromic or redox properties. The particles may also assume a fractal arrangement to form a conductive network. The different kinds of conductive nanoparticles may be also mixed in any proportion to give the desirable properties. For transparent devices these layers should have high optical transmission and low optical haze. In one embodiment the optical transmission of the coating deposited on a clear substrate (e.g., 2.3 mm thick clear soda-lime glass) in the visible range or at 550 nm should be greater than 40%, and in another embodiment greater than 55% and in yet another embodiment greater than 65%. Optical haze of the coatings in non-colored state on a clear transparent substrate (e.g., 2.3 mm thick clear soda-lime glass) as measured by ASTM test method D1003, should be less than 2% and in another embodiment less than 1%. In one embodiment graphene and CNTs (collectively carbonaceous conductive materials) are mixed with their total weight less than 1% by weight of the layer or the coating and in another embodiment less than 0.5% by weight. Their weight is typically greater than about 0.02% in one embodiment and greater than 0.05% in another embodiment. The thickness of these redox layers comprising dyes and conductive particles is less than 100 µm in one embodiment and less than 50 µm in another embodiment and yet less than 30 µm in yet another embodiment. Their thickness is greater than 1 µm in one embodiment and greater than 4 µm in another embodiment and yet greater than 8 µm in yet another embodiment.

In electrochromic devices of the present disclosure and their applications (windows, automotive mirrors or displays, etc.), it is important that the user maintain control on the optical state of the device, meaning that the transition or change from one optical state to the next is done by a user selecting that change, and then applying a desirable voltage to cause that change. In case, for these devices this change is done automatically, then this change must be predicated on electronics connected to the sensors or to inputs that are programmed according to the user's desires that result in causing an intentional optical change. As an example, automatic photochromic and thermochromic effects on electrochromic devices must be avoided because the amount of light falling on an electrochromic device or the temperature in the vicinity of the electrochromic device may not be under a user's control. As additional examples, if an automotive mirror has photochromic properties, it will change color during the day even when the user does not perceive any glare, or if an energy efficient window will change color (become dark) during a bright winter day, when the user would rather have the sunlight come in to warm up the interior of a space. In addition, it is desirable that in electrochromic devices, natural impacts of photochromism and thermochromism are avoided as this causes irreversibility in the electrochromic function and reduces device lifetime. Thus, in certain aspects, all the dyes and materials used in the devices of this disclosure are not photochromic. It is a different matter, if a light sensor or a thermal sensor is used in control mechanism where the electronics are programmed to respond to these stimuli to cause an optical change in an electrochromic device by applying a voltage—this is still termed as user control as the device itself is not electrochromic or photochromic.

The electrochromic devices of the present disclosure are not photochromic, which also means that these devices are not photochromic-electrochromic. The photochromic-electrochromic term refers to devices where either coloring or darkening of a device can be promoted by photochromic activity and the reversal of the optical state is conducted by applying a voltage similar to an electrochromic device (e.g., see published US patent application 20170355901). The devices of the present disclosure do not change their optical state due to the presence of light, i.e., they are not photochromic.

Electrochromic Dyes and their Functionalization

Electrochromic dyes are those which reversibly undergo oxidation or reduction (redox), and this is accompanied by a reversible color change in the optical region (in the visible and/or in the near-infrared regions). For use in windows where solar energy radiation is attenuated, the optical change is generally in the wavelength range of about 400 to 2,000 nm. In one aspect, some of the redox dyes only reversibly oxidize (anodic) and, while others only reversibly reduce (cathodic). In an electrochromic device where, only dyes are used to obtain the electrochromic property, both redox dye types are present so that the reversible oxidation and reduction reaction is balanced, i.e., the electrons removed from the oxidizing (anodic) dyes are taken up by the reducing (cathodic) dyes. Further, the reversible oxidizing dyes are considered to have a strong electron donating character (oxidizing dyes) and the reversible reducing dyes have a strong electron accepting character. The ability to donate the electron or accept the electron at a certain potential determines the electric potential at which the device can be activated to color, i.e., change its optical transmission. Examples of anodic dyes are phenazines, phenothiazines, ferrocenes, tetraphenyl benzidenes. tetraphenyl benzenes, spirobifluorenes (e.g., (2,2',7,7'-tetrakis(N, N-di-pmethoxyphenyl-amine)-9,9'-spirobifluorene), thiophenes, indoles, fulvalenes and carbazoles. Some examples of cathodic EC compounds are anthraquinones and viologens (including monoviologens and diviologens).

The properties of a given anodic dye (or a given cathodic dye) including electrochromic properties may be manipulated by attaching various substituents to the dye molecules, i.e., by attaching substituents with different electron donation or electron accepting capability and by selecting the position of attachment on the dye molecule. Please note that these substituents are not oxidizing or reducing but impact the electrochromic i.e., oxidizing and reducing properties of the dyes to which they are attached to. The change in electrochromic properties means that the electronic properties of the dyes would be shifted. This means that the redox electrochemical potentials of the dyes are shifted (i.e., the potentials at which they color by oxidation or reduction), and also the wavelength region in which they color (i.e., their optical absorption spectrum shifts). This type of substitution on dyes will likely influence other physical and chemical properties such as solubility, thermal and UV stability of the dyes. Thus, these substituents and their positions are to be carefully selected to obtain specific results. FIGS. 4(a)-4(e) shows some of the EC dye molecules as non-limiting examples. These are (a) ferrocene, (b) phenazine, (c) phenothiazine, (d) a viologen salt and (e) anthraquinone dyes. In these molecules, R1 to R47, are various positions where the substituents may be attached. Other commonly used EC dyes not shown in the figure that may be used in the invention of the present disclosure are thiophenes, indandiones, triphenylamines, dithiafulvenyls, tetrahydroquinolines, carbazoles, and indolines, the structures of which dyes are known by persons skilled in the art.

As explained below, a particularly useful compounds which color in the green and the red colors are certain phenazines (FIG. 4b) and certain phenothiazines (FIG. 4c) respectively.

Amongst a specific embodiment of phenazines, R13 is the same as R18, and these are alkyl groups with C1 to C12 (that is with one or up to and including 12 carbon atoms), and these may be linear or branched. Some examples of alkyl groups are methyl, propyl, butyl, isopropyl, tertiary butyl, neo-pentyl. In addition, (a) for one preferred embodiment R12, R11, R20 R19, R14, R15, R16 and R17 are all hydrogen, (b) for another preferred embodiment R12, R20 R19, R14, R16 and R17 are all hydrogen and R11 and R15 are the same alkyl groups where these alkyl groups are those that contain one to 12 carbon atoms (i.e., C1 to C12), and these may be linear or branched. Some examples of R11 and R15 are methyl, propyl, butyl, isopropyl, tertiary butyl, neo-pentyl. R13 or R18 may be the same, or one of these may be a different alkyl to form a covalent bridge to a cathodic dye (for coupled dye systems, as discussed below).

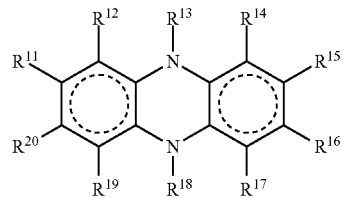

Amongst specific embodiments of phenothiazines (FIG. 4c), R23 is hydrogen, phenyl or alkyl groups with C1 to C12, and these may be linear or branched. R23 may also be an alkyl group used to form a covalent bridge to a cathodic dye (for coupled dye systems as discussed below). Some examples of alkyl groups are methyl, propyl, butyl, isopropyl, tertiary butyl, neo-pentyl. In addition, (a) for one preferred embodiment R21, R22, R24, R25, R26, R27, R28 and R29 are all hydrogen, (b) for another preferred embodiment R21, R22, R24, R25, R27 and R28 are hydrogen and R26 and R29 are the same and are also alkyl groups which are selected from C1 to C12, and these may be linear or branched. Some examples of R26 and R29 are methyl, propyl, butyl, isopropyl, tertiary butyl, neo-pentyl.

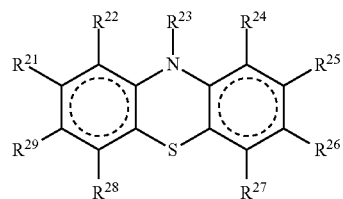

A combination of these in one device, where particularly the specific types of these are used, results in desirable colors and good durability. It was a surprising discovery that the above types phenothiazines in the specific embodiments with specific phenazines and cathodic materials are particularly effective. In certain embodiments, the use of specific phenazines and specific phenothiazines is highly desirable. These materials are electrochemically compatible, that is that within a common safe voltage at which the EC devices are powered, the combination of these materials with cathodic materials also present in the device (such as with viologens), all contribute to the color in a positive way. The specific substitutions for phenazines and phenothiazines disclosed above is able to vary their redox potentials so that these are encompassed within the safe potentials of the device and that they color within similar voltages (electrochemical compatibility). It was surprising to see how the specific substituents disclosed here resulted in phenazines and phenothiazines (both anodic) which could be combined together such that they were electrochemically compatible. Compatible anodic dyes when mixed with cathodic materials including viologens and bridged dyes resulted in desirable activation and color. When the activation voltages are vastly different, then one anodic dye activates first resulting in one color and at a greater potential the second dye kicks in changing the color, and it is also likely that the first dye may degrade at the higher potential which reduces durability, particularly when the first oxidation of the dye coloring at the higher potential kicks in after the second oxidation peak of the first dye. This shows electrochemical incompatibility. The activation voltages are established by cyclic voltammetry, for example at a scan rate of 20 mV/s. It is also highly desirable for electrochemically compatible anodic dyes that the above differences in potentials corresponding to the first oxidation peaks amongst these dyes is low. For example, the first oxidation peak for the selected phenazine and the first oxidation peak of the selected phenothiazine in the mixture are similar would mean that these peaks are separated by less than 0.15V in one embodiment and less than 0.6V in another embodiment. Furthermore, the first oxidation peaks of any of the anodic dyes present in a device is also lower than the second oxidation peak of any of these dyes in the mixture by at least about 0.1V in one embodiment and by about 0.25V in another embodiment. This is to ensure that in a cell, the magnitude of the electrical potentials used to change the optical state is configured such that all of the dyes present can be oxidized and/or reduced by only using their first oxidation reduction peak. Accordingly, such a method of applying voltages to most EC devices provides good durability. The viologens may also be bridged as this provides higher stability (to temperature, cycling and/or UV) to both the viologen and also to its counterpart, e.g., if it is bridged to ferrocene. Thus, mixing the bridged and non-bridged dyes in a EC system surprisingly elevates the durability as compared to using only non-bridged dyes. The typical desired powering voltages for EC devices with dyes are less than or equal to 2V, and in some instances below or equal to 1.5V. In one embodiment, the electrolyte in a device contains at least two different bridged dyes for achieving the desired color in the colored state. The EC devices may have additional electrochromic materials which may be present as a coating. Many of these materials are discussed herein.

FIG. 5 shows a bridged dye which is made by coupling an anodic electrochromic moiety based on a thiophene coupled with methoxy benzene, and a cathodic electrochromic moiety based on viologen. These moieties are bridged (or covalently attached) via a non-conjugated bridge $—(CH_2)_n—X—$. Here X is optional, that is the bridge is $—(CH_2)_n—$ an alkyl bridge. X may be any additional species including an ether bond, an ester, a urethane or an amide linkage, etc. The nature of this bridge close to the anionic part may impact the color of this molecule in the neutral state. R5, is where the dye may also be functionalized that is tethered to link with a reactive group as discussed extensively here to be incorporated covalently into a polymeric matrix. This means that the reactive group is polymerized so that the dye is covalently attached to the matrix polymer. For those bridged dyes which are not coupled into a matrix R5 may be methyl, ethyl, benzyl or other groups. R6 may be methyl, ethyl, etc. or optionally may be a link with a reactive group to couple the molecule to a polymeric matrix. R1 through R4 may be selected from a variety of substituents and are important in influencing the dye color, particularly when oxidized. R1 through R4 may be independently selected from any suitable groups, some of these are —H, alkyl, amino (including tertiary amine), hydroxyl, alkoxy, cyano, nitro, trifluorosulfonyl, etc. These substituents are able to impact the anodic electrochromic properties of the molecule. The impact on the electronic properties of the dyes by these substituents in part is influenced by the change in electronic polarization of the substitution. The electronic polarization of the substituent may be characterized by Hammett Sigma parameter.

It has been found that when anodic and the cathodic dyes (or dye moieties) are covalently linked together (or bridged in certain specific ways) to form a single molecule, the UV durability of these dyes changes. This is due to the internal electron stabilization modes that these molecules offer. For a given set of dyes, this stabilization is dependent on the type of the bridge (σ linkages or π linkages or their combination), bridge length and also the electron donating and electron accepting strengths of the linked dyes. It has been found that the incorporation of σ linkages in the bridge leads to superior UV durability as compared to a dye which is not bridged. UV stability is measured by putting these dyes in an identical EC device and measuring the UV stability of the device by subjecting the devices to similar solar or simulated solar radiation. The devices may be exposed to radiation while they are cycling from bleached to colored state, or when they are kept in different optical transmission states for prolonged periods.

Figure 10F:
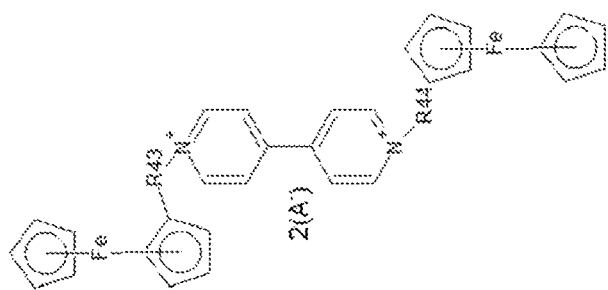
FIGS. 10a-10f show some examples of bridged dye structures.
Figure 10E:
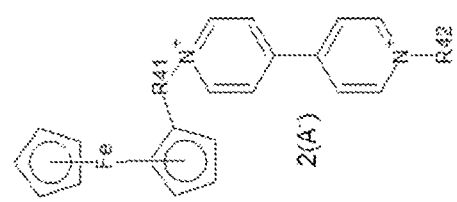
Figure 10D:
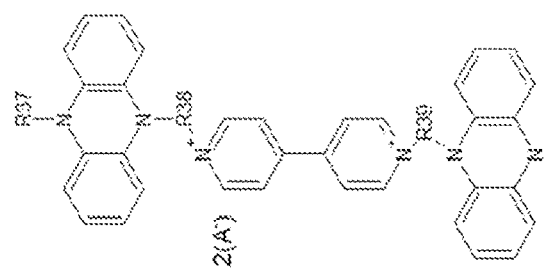
Figure 10C:
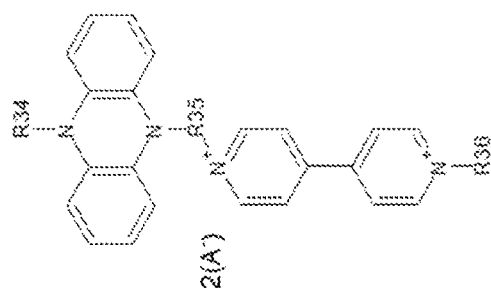
Figure 10B:
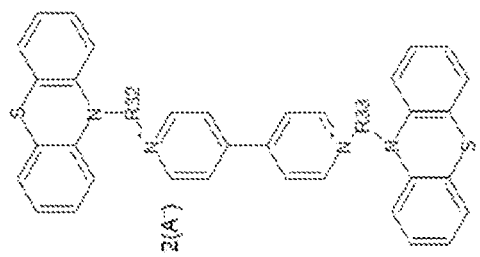
Figure 10A:
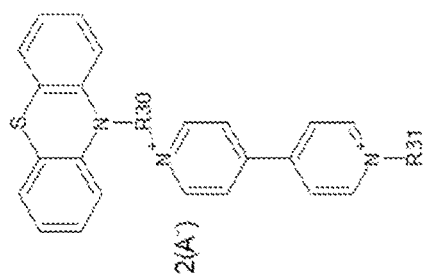

The types of EC devices in which bridged dyes may be used are shown in FIGS. 2c and 2b. FIGS. 10a-10f show more examples of bridged dyes are shown. In all of these bridged dyes the cathodic parts are diviologens, and the anodic parts are phenothiazine (FIGS. 10a and 10b), phenazine (FIGS. 10c and 10d) and ferrocene (FIGS. 10e and 10f). R31, R34, R36, R37, R40 and R42 are substitutions, and in one embodiment these are selected from hydrogen, alkyl groups, branched or linear from C1 to C20. In one embodiment R30, R32, R33, R35, R38, R39, R41, R43 and R44 are selected from linear alkyls from C1 to C8 and yet in another embodiment from C4 to C8. In FIGS. 10e and 10f, other than the linkages on ferrocenium, the others on the ring are all hydrogen, some or all of these hydrogens may also be replaced by alkyl groups, linear or branched from C1 to C4. There may also be other substituents on the phenazines, phenothiazines and ferrocenes as discussed in FIGS. 4a-4e. There may also be substitutions on viologens (e.g., see U.S. Pat. No. 7,855,821). In a similar manner, other anodic compounds may also be used to attach to the viologens which are described above. In these structures, since the cation is the bridged moiety, A⁻ represents an anion which are discussed below. It also must be noted that the dye structures in FIGS. 10b, 10d and 10f are also represented by the schematics shown in FIG. 6h.

When redox layers with dyes are used such as shown in FIG. 2a, then in each of the layer only the anodic or the cathodic part of the bridged dye colors. For example, if the EC layer 13 is cathodic based on tungsten oxide and a bridged EC dye is used in layer 22, where it has both anodic and the cathodic EC character, the anodic part of the dye will color where the cathodic coloration comes both from the cathodic part of the dye and also from tungsten oxide, In another embodiment, for such devices it is not necessary that the bridge always be formed between two EC dyes (that is anodic and the cathodic EC dyes). For example, the bridged dye may be formed between an anodic EC dye (if anodic coloration is required from this layer) and a moiety containing a strong electron receptor which is not electrochromic. Similarly, a dye layer with cathodic EC properties and good UV stability may be formed by incorporating a moiety with a strong electron donor bridged to a cathodic EC dye. Thus, the UV-stable bridged dyes, which are specifically used in a device for only cathodic or the anodic electrochromic properties, may be formed by combining the anodic or the cathodic EC dyes, respectively, with electrochemically stable electron donors and acceptors. Electrochemically stable means that these strong electron donors and acceptors are not oxidized or reduced under the operating voltages applied to the EC devices, which also means that these are not electrochromic at these voltages). Such UV stabilization has also been used extensively for dyes used in dye sensitized solar cells (DSSC). The dyes used in DSSC are not used for electrochromic purposes, that is they do not undergo redox reactions and change color when they are used in that application. The relative strength of an electron donor or receptor may be estimated by ranking its Hammett Sigma parameter, where larger numbers show stronger electron receptor properties. The value of Hammett Sigma parameter depends where the group is attached to the cyclic ring of benzoic acid (i.e., meta or para position). A relative comparison of the strength of the electron receptor or donor of a chemical group can be obtained by looking at the "para" values. A table of these values can be obtained from Lange's Handbook of Chemistry, Edited by John A. Dean, Section 9, 15th Edition, McGraw Hill, 1991. Groups with this parameter equal to or greater than about 0.4 are considered to be strong electron receptors (or electron acceptor). Groups with this parameter equal to or smaller than −0.2 are considered as strong electron donors, and in another embodiment groups with this parameter smaller than −0.5 are considered to be strong electron donors. Thus, the anodic dyes (or dye moieties) bridged to a strong electron receptor (or moieties with strong acceptor groups) will have at least one group with a Hammett Sigma parameter (para value) of greater than about 0.4. Some non-limiting examples of such strong electron receptor groups are —CH$_2$C$_6$H$_5$, —CN, —N(CF$_3$)$_2$ and —SCN.

Some examples of "σ (non-conjugated) linkages (bridges) are alkyl as discussed above. In one embodiment these alkyl chains are linear. Some examples of π (conjugated) linkages are shown in FIGS. 3(a)-3(g). The links may also have a combination of "σ" and "π" groups. Usually the presence of non-conjugated linkages (by themselves or in combination with π linkages) are preferred as they break a continuous conjugated sequence and provide superior UV stability. The bridged dye structure may also be formed by bridging an anodic dye to a strong electron accepter or bridging a cathodic dye to a strong donor. Many of the property predictions of dyes, e.g., impact of substitution and its position, placement position, and type of bridge, can be modeled (e.g., using quantum mechanical models including density function theory). The electron acceptor or the electron donors may also be formed of nanoparticles of appropriate materials such as metals, semiconductor metals and metal compounds including semiconducting metal oxides to which the EC dyes may be attached. Preference is for those nano-materials which are optically not colored. Some examples of electron acceptor nanoparticles are metal oxides such as $SnO_2$, ZnO and CoO.

There may be more than two anodic and cathodic dyes which may be bridged in a particular sequence to get desirable properties from the EC dye molecule. Alternatively, some of them may be bridged non-electrochromic strong donor or accepters with at least one EC dye. A few of these geometric arrangements are shown schematically in FIGS. 6(a)-6(1). "A" represents electron acceptor or anodic dye and "D" represents electron donor or cathodic dye, where at least one of these in each structure has electrochromic properties. Further, to get finer electrochemical and optical tuning of the dye properties, more than one kind of acceptor and/or donor may be used in a given structure. As discussed herein, the linking bridge and substituents also play an important role in obtaining the desired properties. The electrochemical characteristics or electrochemical properties of the anodic or the cathodic moieties in bridged structures which show enhanced UV stability can be different as compared to those dyes where the same moieties are present in a non-bridged state.

Incorporation of Electrochromic Dyes in EC Devices

EC dyes in devices may be incorporated in an electrolyte layer or in a separate redox layer. These dyes may be chemically bonded (e.g., covalently attached) in the layer or may be present as an additive which is not covalently attached. Layers containing EC dyes are called active layers (e.g. see layer 22 in FIG. 2a). Dyes may be functionalized with reactive groups so that the reactive groups could be used to covalently attach these dyes into the matrix of these layers. One end of the functional group is attached to the dye and the other end has a reactive group which can be covalently bonded to the polymeric matrix. Such functionalized dyes with the reactive groups are incorporated in a polymer matrix during the process when such layers are formed or deposited. These dyes are mixed with other monomers which form the polymeric matrix along with other ingredients. Some examples of these are plasticizers, dissociable salts, UV stabilizers, viscosity modifiers, adhesion promoters, polymerization catalysts/initiators, etc. All of these additives or only some of these may be used in the system. The monomers and the reactive ends of the dye copolymerize forming this matrix. This results in formation of thermoplastic or crosslinked polymers with the dyes attached to these materials. Each of the electrochromic layers in the device which has dyes (e.g., layer 22) may have more than one dye to provide color control. For devices that color to a neutral color, a mixture of dyes may be used within at least one EC layer. Use of mixtures is explained below in reference to the other types of devices.

The dyes may be cathodic, anodic, bridged including any of the structures shown in FIG. 6. These reactive groups may be selected from any groups which can easily form covalent links with the polymeric matrix that they are in, some of the common reactive groups are hydroxy, carboxylic, amine, isocyanate, polymerizable unsaturated groups (e.g., vinyl, acrylic, methacrylic, etc.), epoxy and alkoxy.

Figure 7A:
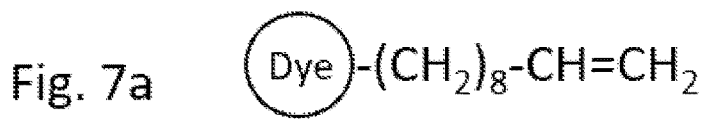
FIGS. 7a-7f schematically illustrates functionalized dyes with reactive ends.
Figure 7B:
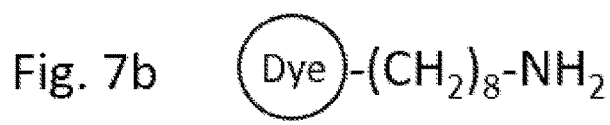
Figure 7C:
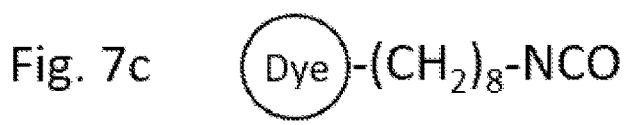
Figure 7D:
Figure 7E:
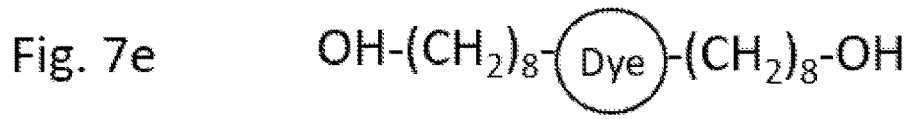
Figure 7F:
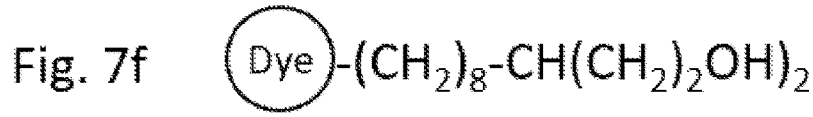

There may be one or more functionalization (linking) groups attached to a dye molecule, and each having a reactive group or more than one reactive group attached to a single linker. Examples of dyes functionalized with various entities is shown in FIG. 7. The functionalization in each of the cases in FIG. 7 is demonstrated using a alkyl(octyl) linking group that is connected to a reactive end shown as (a) vinyl, (b) amine, (c) isocyanate, (d) hydroxyl(e) two hydroxyl groups on different links connected to the dye and (f) two hydroxyl groups connected to the same link on the dye. Instead of only alkyl, other groups may also be present in these functionalization links, some examples of these groups are ethers, esters and polycarbonates. The number of carbon atoms in these links may be any, but a preferred range is 0 to 18 (0 or zero means that there are no carbon atoms between the dye and the reactive group). Smaller number of carbon atoms lead to high steric hindrance and that the reactivity of the link may be influenced by the dye it is attached to which has strong electron donating or accepting properties or even prevent or reduce its polymerization, and higher numbers cause problems with solubility in the plasticizers and/or formulations used to deposit coatings from these, thus in an embodiment number of carbon atoms is in the range of 2-18. In another embodiment the range is from 7 to 18. As a further customization, different linker groups may be selected for different dyes including links which may be of different lengths. In one embodiment the number of reactive groups attached to the functionalization link have a functionality of one, so that these may be incorporated in polymers by reacting with other monomers which have a functionality greater than 2. In another embodiment, the number of reactive groups or functionality of the reactive groups are at least two so that they are themselves able to propagate polymerization. In the latter case, larger number and type of monomers may be used to form the matrix, and the dyes are easily incorporated in any proportion relative to the other monomers. The functionality of the reactive end is dictated by the type of the other monomers being used to form the matrix for the redox layer. For example, a single primary amine group attached to a dye (FIG. 7b) may be considered as bifunctional if it is being incorporated in the matrix by reacting it with epoxy monomers, as each of the two hydrogens on the amine can react with two different epoxy groups. However, when this primary amine is being reacted with an isocyanate monomer to form a urea link then this is considered as monofunctional as one primary amine group reacts with only one isocyanate group. Similarly, a single vinyl, acrylate, or a methacrylate type reactive group (FIG. 7a) is considered as bifunctional when incorporated with other monomers with reactive unsaturated groups (such as vinyl, acrylate and methacrylates). For incorporation in polyurethane and polyurea thermoplastic polymers and crosslinked networks the dyes will have two reactive groups to be considered bifunctional (i.e., with dye molecules with two reactive or functionalized groups, e.g., two amines, two isocyanates or two hydroxyls) so that it is able to propagate a polymerization reaction. For example, the functionalized dye in FIGS. 7a, 7e and 7f are bifunctional. To be compatible with urethane chemistry and still be bifunctional, the two hydroxyl groups in FIGS. 7e and 7f may be replaced by isocyanate groups or primary amine groups.

In one embodiment, the reactive group (e.g., —OH group) of the functionalization link should be far from the dye redox center so that the influence of the dye on the reactivity of the reactive end is reduced.

As an example, a functionalized dye with two reactive isocyanate groups may be made in the following way. The dye is first functionalized having a reactive hydroxy end. The reactive hydroxy group is reacted with a tri-isocyanate. In this case a blocked tri-isocyanate is used where two blocking agents are used. One of these blocking agents only blocks one isocyanate group and comes off at a lower temperature where the above reaction takes place with the hydroxyl group of the dye. The other two isocyanates are unblocked at elevated temperature when the dye attached isocyanate is incorporated in the urethane matrix polymer where other isocyanates and hydroxy containing monomers may be present.

Figure 4A:
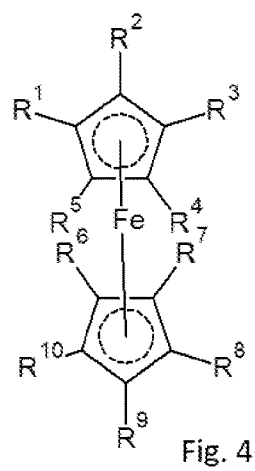
FIGS. 4(a)-4(e) illustrate examples of EC dyes to exemplify embodiments of the present invention.

The dyes may be functionalized in different ways for their incorporation in polymeric matrices by covalent linking. For bridged dyes, the functionalization for attachment to the polymer matrix may be through the electron donor or the electron acceptor or to the bridge itself. One or more than one functionalization group may be attached to a dye molecule. Referring to FIG. 4a, the functionalization group may be attached to any of the positions R1 to R10. As discussed earlier, to attach this group to a polyurethane matrix, the functionalization group may be selected from an isocyanate or a polyol. Examples of alkyl functionalization agents are —$(CH_2)_n$—OH and —$(CH_2)_n$—NCO, where n=2 to 18 in one embodiment and n=7 to 18 in another embodiment. Non-alkyl links i.e., links also comprising ethers, esters and carbonates, nylon and urethane bonds or groups may be used. The remaining R1 to R10 may be attached to a bridge to link this with an electron acceptor if used. The nature of bridge has been discussed before. In one embodiment, R1 through R5 are attached to a functionalization agent and R6 to R10 to a bridge.

Figure 4B:
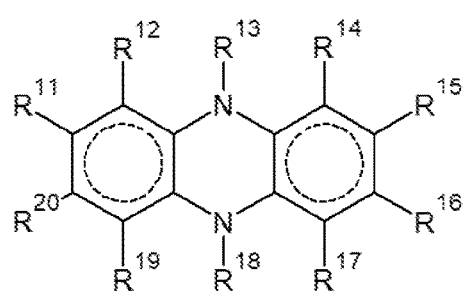

Similarly, other dyes may be functionalized, e.g., phenazine in FIG. 4b may be functionalized through R11 to R20. However, in one embodiment the functionalization or the bridge is attached by reacting through positions R11, R20, R15 and R16. In these embodiment R13 and R18 and the remaining of R11, R20, R15 and R16 may be used to attach substituents to tune the electrochemical, color and other properties of the dye. In yet another embodiment the bridge and/or the functionalization may be attached via R13 and R18.

Figure 4C:
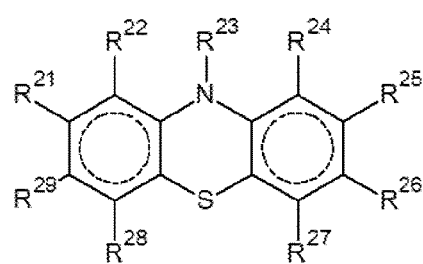
Figure 4D:
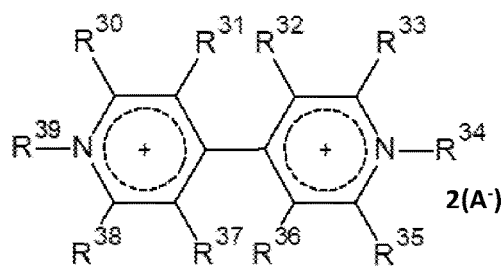

In FIG. 4c, positions R21 to R29 may be used for attaching functionalization groups, bridges and substituents in the phenothiazine dye. As an example, if the Phenothiazine is bridged to viologen in FIG. 4d, the two may be bridged through R23 and R39, but the functionalization group is attached via R34. In FIG. 4d, positions R30 to R33 and R38 to R35 may be used to attach substituents to change the dye properties.

Figure 4E:
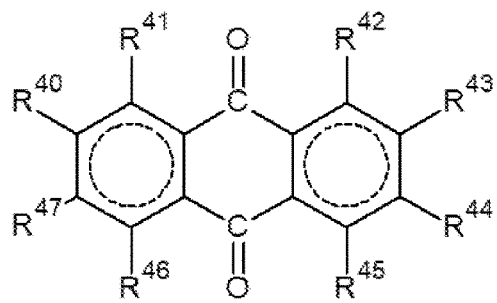

FIG. 4e shows an anthraquinone molecule. R40 to R47 may be used to attach functionalization links, substituents to change the dye properties and the bridge. The more preferred sites to attach the bridge and the functionalization links are made at R40, R43, R44 and R47.

Figure 8:
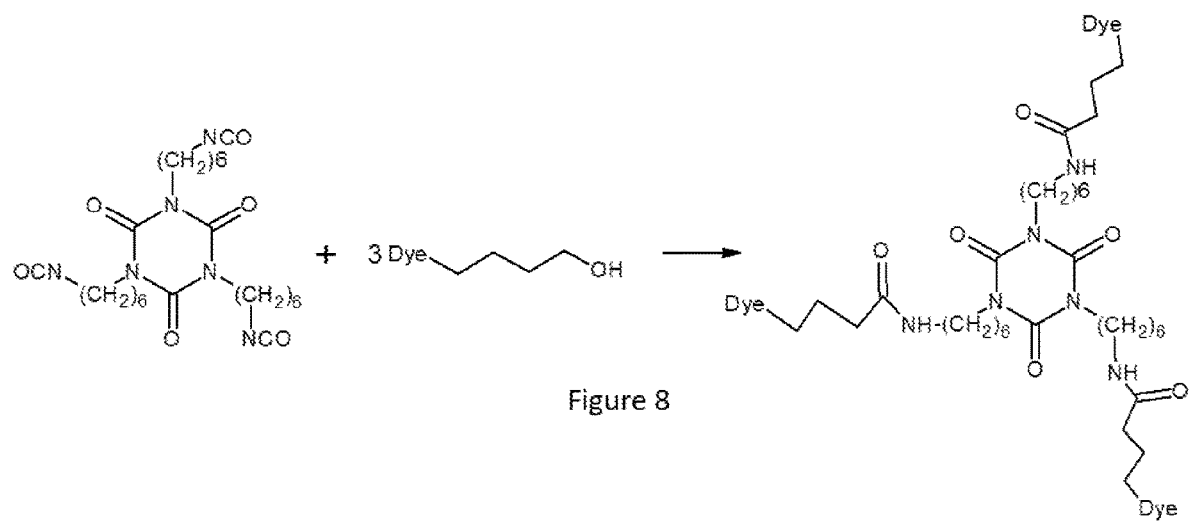
FIG. 8 illustrates an EC dye macromer formed by reacting a functionalized dye with a tri-isocyanate.

One method of forming an active EC layer is to form a large electrochromic molecule which is mixed or dissolved with a monomer formulation and a coating is deposited using this. When the coating is cured (or solidified), crosslinks are formed by the polymerization of the monomer. The EC molecule is physically trapped in the crosslinked polymeric matrix but is not covalently attached. Typically, any weight fraction of the monomer may be used and in one embodiment it is about greater than 50%. An example of a large molecule (and its preparation) where three dye molecules are attached through an IPDI (isophrone diisocyanate) trimer is shown in FIG. 8. The three dyes shown schematically may be the same or all may be different, or these may be present on an average in different proportions so that electrochromic properties including color may be tuned. These dyes may be selected from various dyes including the bridged dyes. FIG. 8 shows a method wherein the dye is functionalized, that is the functional group is —$(CH_2)_n$— OH, where n in this case is 6, but in one embodiment it may be selected from 2 to 18 in one embodiment and 74-18 in another embodiment. In one embodiment the molecular weight of these large dye containing molecules (or called dye macromers) is 2000 or more and in another embodiment 4000 or more and in another embodiment 10,000 or more. Typically, their molecular weights will be less than about 100,000 in one embodiment and less than about 25,000 in another embodiment. Further, in one embodiment, these dye macromers will have at least two EC dye molecules and three or more in another embodiment and 5 or more in yet another embodiment. These macromer dye structures are not to be construed as electronically conductive polymers which may be electrochromic and have molecular weights in this range, because conductive polymers have conjugations throughout their structure. These conjugations allow them to conduct electrons. Here at least two of the electrochromic dyes (or moieties) in the structures will be linked via non-conjugated links, which are "σ" links or a combination of "σ" and "π" links.

The dyes used to form the dye macromers may also be bridged dyes. These dye macromers are pre-formed, i.e., they are synthesized prior to putting them in a monomeric or polymeric formulation used to form the electrochromic or the redox layer. In some embodiments these macromers may have a link with a reactive group which reacts further with the matrix forming monomers, but these macromers are formed first prior to their incorporation into the formulation.

In other embodiments isocyanate chemistry is used to create the materials and layers of the present disclosure In one variation, the dye functionalization is carried out using e.g., an amino group such as —$(CH_2)_n$— $NH_2$ and is reacted with the isocyanate trimer (e.g., the IPDI based trimer shown in FIG. 8) to form a urea. In another aspect, the dye may be functionalized using —$(CH_2)_n$— NCO so that it may be reacted with a polyol (e.g., a triol or a triamine rather than an isocyanate trimer) to form a large molecule containing urea or urethane linkages. Typically, "n" in —$(CH_2)_n$— ranges from about 2 to 18, and other non-alkyl groups with the same number of carbons in the link as mentioned above may also be used. Dyes functionalized by the Isocyanate reactive groups allow use of several types of monomer choices for formation of matrix polymers to which the dyes are covalently bonded to. For example, isocyanate groups react with hydroxyl groups to form urethanes, with epoxy rings to form oxazolidone, with amides to form acylurea and with anhydrides to form imides. For example, the dye molecule produced in FIG. 8 may also be tied into a polymer network. If the polymer network is formed by polymerizing a monomer formulation containing isocyanates, the isocyanate monomer can react further with the urethane links of the product formed in FIG. 8 by forming allophanate links. The allophanate links usually form at more elevated temperatures (generally between 100 to 150° C.) when excess isocyanates are present. If rather than reacting polyols and isocyanates in FIG. 8, a reaction is performed between the isocyanates and an amine terminated functional dye, then the product will have urea linkages. In that case the isocyanate in the monomer formulation can form biuret links after reacting with the urea.

Schematics of another dye macromer structure resembling a dendritic structure which may be physically constrained in a polymer network is shown in FIG. 9a. In one method, an intermediate is made by reacting a tetra-functional polyol (seed monomer) shown as 91 with a tri-isocyanate 92 in a proportion where one more polyol is used and four moles of tri-isocyanates are used. During this reaction, two of the isocyanate groups in the tri-isocyanate are blocked (creating a partially blocked isocyanate) so that undesirable molecular structures which would not give rise to the dendrimers are not formed. Standard methods to block isocyanate groups may be used where these are blocked by pre-reacting with active hydrogen or methylene compounds (e.g., malonic ester). These isocyanates come unblocked at a certain temperature, thus the first reaction between the polyol and the partially blocked tri-isocyanate is carried out below this temperature. Once the intermediate is formed, one mole of this intermediate is reacted with 8 moles of functionalized dye molecules which have been pre-functionalized so that each dye molecule terminates in —OH groups which will react with the isocyanate ends of the intermediate. However, this reaction is carried out under conditions where the blocked isocyanate groups are unblocked. The polyol used may be of any type and may be selected generally from those of an ether, ester or a carbonate type, and the isocyanate is preferably an aliphatic isocyanate (e.g., see the reactant trimer in FIG. 8).

A more practical way of using partially blocked isocyanates, is to use isocyanates which are blocked with multiple blocking agents (or at least two blocking agents), e.g., see European patent published application EP 0403044A2, which is incorporated herein by reference in its entirety. In order to achieve the reaction described above, the first blocking agent comes off at a lower temperature to form this intermediate and later when the functionalized dyes are reacted the second blocking agent comes off.

The above is only a representative reaction and many variations are possible, some of which are (a) functionality of the monomers may be different, (b) several additional rounds of intermediate preparation may be used to grow the dendrimer before it is end-capped with the dyes (c) different dyes may be used in the same dendritic molecule and (d) the dyes may be functionalized with different groups, including where the chain length of the functionalization attachments are different.

As examples, to make a dendritic molecule the starting molecule (or the seed) may be a blocked tetra isocyanate which is reacted with a polyol having a functionality of three and sequentially uncapping each block to form an intermediate and this is then end-capped with a dye functionalized with an isocyanate end. The seed may use urea chemistry by starting out with a tetrafunctional amine, reacting that with blocked tri-isocyanate and end-capping with a dye end-capped with an amine. If all of the ends of the dendrimer are not end-capped with the dye, then the remaining reactive ends may be further reacted with the polymer network in which the dendrimers are present.

When these dye macromers are present in a polymer matrix which has a plasticizer and a dissociable salt, then in one embodiment at least one of the monomers to form the large molecule is soluble in the plasticizer, and in another embodiment all of the monomers used are soluble in the plasticizer. This solubility creates a local environment around the dye which is more conducible to enter into electrochemical reactions when the device is colored or bleached.

Another kind of a dye macromer with multiple dyes attached may take a more linear or a graft configuration as shown in FIG. 9b. To form such molecules, isocyanates blocked with multiple blocking agents may be used as discussed above. Functionalized dye molecules are covalently attached to the intermediate molecule 95. R48 and R49 are the ends of the molecule which may be inert or are able to participate in a reaction to covalently attach to the polymer matrix.

Although most of the above discussion centers around isocyanate and urethane chemistry, depending on the polymer matrix, other chemistries may also be used. Some examples of reactive groups are vinyls and acrylics (generic mention of acrylics includes methacrylates unless mentioned otherwise) and epoxies, —$(CH_2)_n$-Ep and —$(CH_2)_n$-Ac, wherein Ep is an epoxy ring which may be polymerized and Ac is a polymerizable acrylic group. In one embodiment, the macromers may have at least one reactive group (functionalization) that is used to react covalently to the polymeric matrix forming the layer in which it is incorporated into.

The coating formulations for depositing redox layers in addition to the monomers, polymers, dyes and conductive particles may also comprise several other materials including solvents and plasticizers. Solvents are removed during processing of these layers, and these have a boiling point of less than about 130° C. Plasticizers are typically high boiling point liquids which are not removed after the layer is formed. Typical boiling points for plasticizers are in excess of about 150° C. and in another embodiment in excess of 200° C. Some examples are propylene carbonate, ethylene carbonate, Y-butyrolactone, tetraglyme, sulfolane, monofluoroethylene carbonate, difluoroethylene carbonate, hydrophobic ionic liquids with electrochemically stable ions such as those with cations of imide ($N(CF_3SO_2)_2^-$, beti (($C_2F_5SO_2)_2N^-$), methide ($CF_3SO_2)_3C^-$). An example of an ionic liquid (IL) is 1-butyl-3-methyl pyrrolidinium bis(trifluoromethanesulfonyl)imide (BMP), including mixtures containing these. The formulation may also contain dissociable salts of for example lithium, ammonium, imidazolium, pyrrolidinium cations with electrochemically stable anions such as triflate ($CF_3SO_3^-$), imide ($N(CF_3SO_2)_2^-$, beti (($C_2F_5SO_2)_2N$), methide ($CF_3SO_2)_3C^-$), tetraflouroborate ($BF_4^-$), hexaflourophosphate ($PF_6^-$), hexafluoroantimonate ($SbF_6^-$), bis(fluorosulfonyl)imide ($N(CF_3SO_2)_2^-$, hexafluoroarsenate ($AsF_6^-$), and perchlorate (these salts are also present in the electrolytes of the various devices discussed in this disclosure). The same anions are also used in dyes utilizing viologen salts. Anions shown as A⁻ in FIG. 4d or FIGS. 10a-10f may be selected from the above anions. Still further, the formulations may also have catalysts, surfactants, UV stabilizers, rheology and foam control agents, adhesion promotion agents, and also other monomers and associated catalysts which may be polymerized after the device is assembled to give interpenetrating networks across several layers (e.g., see published US patent application 20200019032, which is incorporated herein by reference in its entirety).

Because all anions do not confer the same durability, appropriate anions are used according to the present disclosure to ensure device longevity. This durability is measured by cycling the devices at elevated temperature to accelerate changes during the test duration to correlate these with device lifetime, and in some tests the devices are simply subjected to strong UV radiation (for example see test procedure from the Society of Automotive Engineers, SAE J1960), while in other tests the devices are cycled under strong UV while the temperature is also elevated (e.g., see test procedure from American Materials Testing Society, ASTM E2141). As an example, it has been shown in some of the electrochemical literature, that use of perchlorate anions causes an interaction with propylene carbonate (a plasticizer often used in the battery and EC devices) which results in the decomposition of PC and evolution of carbon dioxide gas. This propensity is lowered when tetraflouroborate ($BF_4^-$), hexaflourophosphate ($PF_6^-$), hexafluoroarsenate ($AsF_6^-$) anions are used (Leggesse, E. G., et al, 2013).

In certain aspects, the present disclosure advantageously provides methods and devices that do not use fluorinated anions, and in another embodiment do not use halogenated anions, so that disposal and recycling issues due to toxicity are reduced or avoided. For example, use of perchlorate is avoided according to the present disclosure. Non-halogenated anions means that the anions should not have any halogens or halogen groups attached to them. Some high-volume applications of EC devices are automotive rear-view mirrors and windows for buildings and automobiles/transportation. However, the present disclosure provides devices in which the durability of the device is not compromised despite use of anions without fluorine (or without halogens in another embodiment). Depending on the application, the EC cells are configured to be durable to UV exposure, cycling under heat, and cycling under both heat and UV exposure.

As discussed above, anions are added into the device through a number of components. Cathodic EC dyes are based on viologen salts where the anions are typically halogenated and selected from the above provided list. In addition, the electrolytes or EC electrodes (when present) may also have ionic liquids and salts, where the anions are selected from the same halogenated group discussed above. A class of non-halogenated anions are derived from borates. An attractive non-halogenated anion for dyes, ionic liquids, and salts is bis(oxalate)borate (also known as bis(ethanedioato)borate or "BOB"). First, from a practical standpoint, such materials must be made and incorporated into the electrolytes or the devices to confirm that these materials are soluble in the desired concentration range We also determined that the dye salts with BOB anions are soluble in carbonate solvents in the desired concentrations which are useful in a device. Second, as discussed below, the present disclosure provides devices with BOB that are established to be durable, e.g., for 10, 20, 30 years or more.

According to the durability aspects of the present disclosure, the EC cells containing non-halogenated anions are configured to pass tens of thousands of cycles at elevated temperatures and even when exposed to UV, depending on the application. A quick assessment of thermal durability of the EC cells with these anions for window applications comprises demonstrating that the cells can cycle for at least 1,000 times at 90° C. without any noticeable change in their bleached state, the colored state, and the rate (kinetics) at which they change from the bleached state to colored state and vice-versa. This cycling at 90° C. must be done so that there is at least 6:1 change in contrast ratio (ratio of "transmission at 550 nm in bleached state" to the "transmission in colored state at 550 nm"). For mirrors, reflection may be used instead of transmission, and the temperature used is 60° C. instead of 90° C., and all of the other parameters are similar.

For window applications, to establish durability, EC cell characteristics may be evaluated at room temperature while using the same powering and bleaching protocols (color and bleach voltages being the same) before and after cycling. The characterization voltages may be different from the cycling voltage at 90° C., but must show a contrast change of at least 6-fold as noted above. The reference point before cycling may be taken for the device as produced, or after giving certain conditioning treatments including heat treatments and cycling. The device is characterized after this conditioning treatment and then it is then cycled for 1,000 times at 90° C. "Without any noticeable change" in the EC cell (or a EC device) characteristics before and after cycling means the following:

a. Transmission in bleached state at 550 nm after cycling to be within 10% of before cycling. As an example, if prior to cycling the bleached state transmission is 70%, then after cycling the bleached transmission must be within 70±7%.
b. Transmission in colored state at 550 nm after cycling to be within 30% of before cycling. As an example, if prior to cycling the colored state transmission is 3%, then after cycling the colored state transmission must be within 3±0.9% (0.9% is 30% of 3%).
c. The kinetics or the rate of electrochromic change during coloration or bleaching process measured at 550 nm should be within 20%. Coloration or the bleaching rate of an electrochromic device is given by the time take to cover 80% the range from the start. As an example, if a device prior to cycling, has a range at 550 nm of 70 (bleached) to 3% (colored), its range is 70−3=67%, and 80% of this range is 53.6%, thus the rate of coloration is the time taken to color $t_{c1}$ from 70% to 16.4% (70%-53.6%). Similarly, the bleach rate tbi is calculated from 3% to 56.6% (3+53.6%). After cycling, the range is established (and the transmissions in these states are bound by (a) and (b) above. and then the coloration and bleach rates after cycling (i.e., $t_{c2}$ and $t_{b2}$) should be within 20% of $t_{c1}$ and $t_{b1}$ respectively. For example, if $t_{c1}$ prior to cycling at 90° C. is 30 s, then after cycling $t_{c2}$ should be within 30±6 s (as 6s is 20% of 30s).

In one embodiment it is desirable that when EC devices are made incorporating non-fluorinated or a non halogenated ion such as a BOB anion, then such anion must be used for dye salts and any other non-electrochromic salts (including ionic liquids) if added into the device or the electrolyte. The EC dyes used in a device may be bridged dyes or separate anodic and cathodic dyes, where at least one of the dyes is a salt structure where the electrochromic cation requires an anion to be used. As examples of EC devices and applications, the automotive commercial EC mirrors and aircraft windows and emerging windows for buildings and other transportation applications have a construction as shown in FIG. 2c. For mirrors, one of the TC layers is usually replaced by an electrically conductive layer (or a stack of layers) which also provide partial or complete reflectivity (e.g., see U.S. Pat. No. 6,870,656). Some examples of EC salts are viologen salts (including any viologen derivatives, which also includes bridged dyes containing viologens). Some examples of non-electrochromic salts which are added to the EC devices are ammonium salts with organic cations such as tetraalkyl ammonium (e.g., where alkyl are methyl, ethyl, propyl and butyl and their mixtures). Some other examples of such salts with organic cations are imidazolium, pyrrolidinium piperidinium, etc. which form salts or ionic liquids with BOB. Another example is lithium salt which is represented as LiBOB.

Bis(oxalate)borate or BOB anion-containing EC devices with EC dyes in an electrolyte may have the following constructional and compositional features, in addition to the other aspects described throughout this disclosure. The present disclosure includes fabricating EC devices for mirrors and windows by enclosing a liquid or a solid electrolyte between two conductive electrodes, one of which is transparent. The electrolyte may be a liquid or a solid. One method to form the solid electrolyte is by introducing a liquid formulation with monomers and associated polymerization catalysts (while also containing the liquid plasticizer such as propylene carbonate, dyes and other additives) into a cavity formed by the opposing conductive electrodes and then polymerizing/crosslinking the monomers which results in solidification. The typical concentration of the monomers in this electrolytic formulation is about 1 to 20% by weight of the total formulation. Another method is to produce an electrolytic film with the dyes and electrolytic plasticizers and other additives, and then laminating that film between the two conductive substrates, in this case the polymeric content is from about 25 to 60% by weight of the film. In one embodiment the electrolyte thickness is from 5 microns to about 1,000 microns. In another embodiment, this range is from about 100 to 450 microns. These electrolytes may contain both the anodic and the cathodic dyes and/or the bridged dyes. The concentration of the dyes with BOB anion in the electrolyte is in the range of 0.01M to 0.5M calculated on the plasticizer (e.g., propylene carbonate). The BOB anion in the device may originate from the dye-salt (a dye in the form of a salt) or any other non-electrochromic salt (including an ionic liquid). The dye concentration (both each of the anodic and cathodic species) is also in a range of about 0.01 to 0.5M (also based on the plasticizer content). When a EC dye salt is used where the anion is BOB, then if an additional non-electrochromic salt is added, then it is preferred that the salt anion is also not halogenated, such as by using salts with BOB anion. One or more UV stabilizers are also added in the liquid or the solid electrolytes which are present in a range of about 0.1 to 10% by weight of the electrolyte. Several dyes may be used in the electrolyte for color selection as discussed elsewhere.

Dyes of these invention may also be incorporated in the electrolyte of the devices shown in FIGS. 2b and 2c or in the electrode 22 of FIG. 2a. One objective of this is to also customize transmissive color in the dark state while using clear substrates which are not colored so that the bleached state is close to being colorless. For example, some of the desirable colors are blue-gray, blue-green, brown and neutral. In one embodiment for devices in FIG. 2b, tungsten oxide is used as the electrochromic material present in the EC layer 13b and at least two dyes are used in the electrolyte layer 14b. In general, the color in this disclosure is measured using the color coordinates using CIE 1976 L*a*b* color space; from International Organization for Standardization, Geneva, Switzerland. The L* axis refers to the darkness level, where L*=100 is completely white and L*=0 is completely black. Generally, in the colored state, the EC devices have a L* value of about 40 or lower. The coordinate a* refers to increasing red when positive and increasing green when negative. Similarly, coordinate b* refers to increasing yellow when positive and increasing blue when negative. These three coordinates result in a color sphere. In one embodiment, neutral color is defined as a circle around the L* axis, and smaller is the circle, more neutral is the color. The circle around the L* axis is defined as the square root of $(a^{*2}+b^{*2})$. Sometimes this value is also defined as c*, that is $$\sqrt{(a^{*2}+b^{*2})}=c^*$$

Thus, in one embodiment the neutral color (or neutral state) is where c* is less than or equal to 6, in another embodiment this is less than or equal to 10 and yet in another embodiment this is less than or equal to 15. In a further embodiment a device with a combination of three dyes selected with EC activity in different parts of the visible spectrum has a lower c* value as compared to a device with two dyes (or one bridged dye having anodic and cathodic EC elements). The former will have a better chance to produce a more neutral color in the colored state. In another embodiment the neutral color of the EC cell should be both in the bleached state and in the colored state. In another embodiment the change in c*in going from the bleached state to the fully colored state should be less than 5, and in another embodiment less than 10. Furthermore, for some EC device applications, certain colors are more acceptable in the dark state. For example, for windows that are used in buildings and transportation, in the darkened state, the neutral colors or blue-gray or blue-green are more desirable as compared to intense blue or intense green. Therefore, the desirable colors would be those which in the colored state would have c*of less than 20, and a* and b* would be between +6 and −20 (minus 20). Since the transmitted color of the cells (or reflected color for mirrors) is influenced by the transparent substrates which are used in the construction of these devices in addition to the electrochromic elements, for demonstrating this invention clear substrates are used such as non-colored, clear soda-lime glass, low-iron clear glass, clear transparent plastics such as polycarbonate and polyesters. Clear substrates typically have a transparency of greater than about 80% in the visible region or L* values of the EC devices made using clear substrates is equal to or exceeds 80.

The clear (and non-colored) substrates are typically clear plastics such as polycarbonate, polyester (polyethylene terephthalate, polycarbonate, etc), clear glass such as soda-lime glass, Optiwhite™ (a low iron glass from Nippon Sheet Glass (NSG), Toledo, Ohio). These may be coated with transparent conductors such as indium-tin oxide or fluorine doped tin oxide. In general, for window applications in one embodiment the surface resistance is in the range of 6 to 20 ohms/square and in another embodiment, this may be in the range of about 0.1 to 20 ohms/square, and may comprise of multiple layers of metals and conductive oxides. Some of the transparent conductors with fluorine doped tin-oxide products available from NSG are TEC™15, TEC™10, TEC™8, TEC™7 and TEC™6. Preferred substrates for most applications should have a optical haze value of less than about 5% in one cases less than about 2%, In reference to FIG. 2a, the dye containing layers will have more than one dye which is functionalized and attached to this layer covalently, where these dyes color in different spectral regions to result in a device that colors to a more neutral color. This is explained more fully below in reference to FIGS. 2b and 2c where non-functionalized dyes are used.

In reference to FIG. 2b, for neutral coloring cells, EC layer 13b comprises tungsten oxide. The coating (layer) thickness is generally between 150 nm to 600 nm, and in another embodiment between 200 and 500 nm. The tungsten oxide colors to a blue color (that is in the colored state this coating has a b*<−25), but with certain dopants, such as oxides of Mo, V and Ni this may color to a more neutral color (i.e., b*>−6). The electrolyte comprises of dyes which are anodic, mixtures of several anodic dyes, mixtures of anodic and cathodic dyes and also mixtures of bridged dyes along with anodic dyes. In one embodiment the total concentration of all of the dyes in the electrolyte is in the range of 0.01 to 2M, and in another embodiment between 0.02 to 1M. In another embodiment the electrolyte contains at least one bridged dye and at least one anodic dye. These dyes may not be functionalized. For electrolytes which are solid because they comprise a crosslinked polymer network, one or more of the dyes may be optionally attached to the network by covalent linking using dyes which are functionalized. Some of the preferred dyes comprise of ferrocene bridged to viologen via an alkyl group (e.g., C2 to C8, that is containing 2 to 8 carbon groups). Another dye that is added in combination with the above bridged dye belongs to the class of phenothiazines (see FIG. 4c) and specific phenothiazines which are discussed above. The electrolyte may have several dyes, and in one preferred embodiment that provides neutral colors are ferrocene, viologens phenothiazines and bridged dyes formed by bridging viologens with ferrocene, or viologens with phenothiazine or viologens with phenazine. In one embodiment when phenothiazines are used, their molar concentration is 75% or more as compared to the other dyes when using blue coloring tungsten oxide coating. Further, the oxidation of the anodic dyes should preferably be within 0.3V, and in another embodiment within 0.2V. Similarly, the reduction of the cathodic dyes (when more than one is present) that their reduction potentials relative to each other should also be in similar range. This also is important for devices of FIG. 2c which are discussed below. To impart greenish hue, phenazines may be added (FIG. 4b where R13 and R18 are the same and are usually alkyl such as methyl or isopropyl group and others (R11, R12, R14, R15, R16, R17, R19 and R20) are hydrogens.

In reference to FIG. 2c, for neutral coloring cells one combination are dyes where there are at least 3 dyes, wherein one has a peak absorption in the range of 400 to 480 nm, another between 480 and 570 nm and another in the range of 570 to 650 nm. It is to be understood that when different dyes are used, then for obtaining neutral color or a more desirable color at least three of the dyes should color in different regions of the light spectrum. Bridged EC dyes with anodic and cathodic coloring fragments are counted as two dyes. This means that if three dyes are used for color neutrality, their peak absorption between any two dyes should be different from each other. In one embodiment this difference is 75 nm or more and in another embodiment this difference is about 30 nm or more (all within the visible spectrum of 400 to 700 nm). If more than three dyes are used then their absorption peaks may be closer, but at least three of these will have a separation as described above. If a dye has multiple absorption peaks, the peak with a higher optical absorption is taken for that dye. There may be additional dyes coloring in overlapping spectral ranges, and some may also color in the near infra-red (NIR, i.e. from about 700 to 2,000 nm). These dyes may be a combination of anodic and cathodic dyes, wherein at least one of each kind must be present. In one embodiment at least two cathodic and one anodic dyes or two anodic and one cathodic dyes are present. The anodic and cathodic dyes color in different wavelength ranges for neutral color as discussed above. In one example, phenothiazines (see FIG. 4c) including specific phenothiazines which are discussed above along with viologens (FIG. 4d) and ferrocenes (FIG. 4a) are combined. In one embodiment phenothiazine(s), phenazine(s) and ferrocene(s) bridged to viologen via an alkyl group (as discussed above) are used. In another embodiment, along with the bridged dye, non-bridged dyes may also be used in the device. The electrolyte may have bridged dyes formed by bridging viologens with ferrocene, or viologens with phenothiazine or viologens with phenazine. In one embodiment when bridged dyes containing viologens are used along with other viologens, the molar concentration of the phenothiazine(s) is higher than the molar concentration of the bridged dyes containing viologens that are listed above. In one embodiment the total concentration of all of the dyes in the electrolyte is in the range of 0.02 to 2.5M, and in another embodiment between 0.03 to 1M. These dyes may not be functionalized. For electrolytes which are solid because they comprise a crosslinked polymer network, one or more of the dyes may be optionally attached to the network by covalent linking using dyes which are functionalized. To impart greenish hue phenazines may be added (FIG. 4b where R13 and R18 are the same and are usually alkyl such as methyl or isopropyl group and others (R11, R12, R14, R15, R16, R17, R19 and R20) are hydrogens. In one specific embodiment, at least two viologens are used in a device wherein each viologen colors in a different parts of the visible spectrum along with an anodic dye that colors in a different part of the spectrum as compared to the viologens.

On the L*a*b* color scale, negative polarity (negative value) of a* means that this has green hue, positive a* value means that it has a red hue, negative polarity of b* (negative value) shows increasing blue hue and increasing positive value of b* shows a yellow value. In general, a color hue is a combination of a* and b* value, and it is desirable that, as the device darkens, its a* and b* values change in the same direction with increasing voltage so that a gray scale is obtainable without the device transitioning from one color to a different color with different applied potentials. In EC devices with more than two EC anodic or two cathodic dyes in the electrolyte, it is often found that when these devices are colored, one of these dyes activates at a different potential which gives rise to transition colors which are different from the final color and are not desirable in many applications. For example, a device using two anodic dyes when colored simply does not go from a clear to a darker state while maintaining similar polarity of a* and b*. This is because of their differences in anodic coloration potentials. As the coloring potential of the device is raised, or as the apparent potential increases during coloration (as leakage current for a device decreases with time, even if the applied potential is constant), the device may transition from one color to another as the dye with lower anodic potential colors first, and with time the second dye will participate in coloration changing the overall perceived color. This change in color can be reduced by selecting the dyes with certain redox potentials to be close to one another as explained below. In one embodiment of the present disclosure, to avoid this color change, the first anodic potential to oxidize the two anodic dyes should be similar, as the dyes may have more than one anodic redox potential. The same is true for bridged dyes, where their first anodic redox peaks should be similar (in case there are several anodic redox states). Similarly, the first cathodic redox potentials of the cathodic parts should be similar when two or more cathodic dyes are used. In one embodiment this similarity means that the peak redox (anodic) potentials for the first peak for either the anodic dyes used should be within a spread of 0.25V, and in another embodiment, this spread should be within 0.15V. The same holds true for a mixture of cathodic dyes where there cathodic redox potentials should be in a similar range. According to one aspect of the present disclosure, the relative activity of the dyes is balanced by also changing their relative concentrations. For example, the present disclosure includes using a lower concentration of the dye which gets activated first (e.g., lower oxidation potential for an anodic dye). In another embodiment, present disclosure includes keeping the diffusion rates of the dyes similar to each other (as during bleaching process, one dye may diffuse and bleach faster which would give rise to transitional change in color which are not desirable). In one embodiment, the hydrodynamic radii of the dyes should be similar, e.g., within 20%, 15%, or 10% of each other. In some aspects, the hydrodynamic radii may be approximated by the molecular weights of the bridged dyes, which should be similar, e.g., within 20%, 15%, or 10% of each other.

In some aspects, for the devices of the present disclosure to attain neutral or desirable colors, it is also important not only to select dyes based on their absorption peaks, but also their concentrations. This is important for a couple of reasons, first, as the dyes have different redox potentials, for a given coloring potential in a device, different dyes will convert to the colored species to different extent, thus this conversion can be controlled by varying the concentration of the dyes relative to one another. Second, different dyes have different specific absorbance (i.e., for the same amount of conversion, the dyes may have strong or relatively weak absorbances), and this has to be balanced out so that absorbance from one dye does not dominate the spectrum. Thus, the relative concentrations depend on the above-discussed dye properties.

Exemplary aspects of the present disclosure include the following items and all combinations and permutations thereof:

Set A

1. An electrochromic dye with an attached functionalization group wherein the said electrochromic dye colors by at least one of oxidation and reduction and contains at least two moieties wherein a first moiety is electrochromic and a second moiety is an electrochromic moiety, an electron donating moiety, or an electron receiving moiety and wherein the functionalization group is characterized by having
    (a) a reactive group which is able to covalently attach to the other molecules, and
    (b) the reactive group is separated from any of the electrochromic, electron donating and electron receiving moieties by a linker which has from 0 to 18 carbon atoms, 2 to 18 carbon atoms, or 7 to 18 carbon atoms.
2. The functionalized electrochromic dye as in item 1, where the reactive group is a hydroxyl group, a carboxylic group, an amine, an isocyanate, a vinyl group, methacrylic group, an acrylic group, an epoxy group, or an alkoxy group.
3. The functionalized electrochromic dye structure as in item 1 or item 2, comprising two or more reactive groups.
4. The functionalized electrochromic dye as in any one or combination of items 1 and 2, wherein the reactive group is reacted with other monomers to form a polymeric material.
5. The functionalized electrochromic dye as in item 3, wherein the reactive group is reacted with other monomers to form a polymeric material.
6. The functionalized electrochromic dye as in any one or combination of items 1-5, wherein the linker comprises at least one of alkyl, ether, urethane, nylon, ester, and carbonate.
7. The functionalized electrochromic dye as in any one or combination of items 1-6, wherein at least one of the said at least two moieties comprise one or more of ferrocene, phenazine, phenothiazine, viologen salt, anthraquinone, indandione, triphenylamine, dithiafulvenyl, tetrahydroquinoline, carbazole, indoline and nanoparticles.
8. The functionalized electrochromic dye as in any one or combination of items 1-7, wherein the at least two moieties in the electrochromic dye are selected so that at least one of the following applies (a) at least one anodic electrochromic moiety is bridged to at least one electrochemically stable strong electron acceptor moiety, (b) a cathodic electrochromic moiety is bridged to a electrochemically stable strong electron donating group, and (c) one anodic electrochromic moiety is bridged to at least one cathodic electrochromic moiety.
9. The functionalized electrochromic dye as in any one or combination of items 1-8 wherein the said dye comprising at least one of:
    (a) an anodic dye bridged via an alkyl group to a electron donating group being characterized by Hammett Sigma Parameter of at least 0.4;
    (b) a cathodic dye bridged via an alkyl group to an electron acceptor wherein the said electron acceptor is characterized by Hammet Sigma Parameter of equal to or less than −0.2.
10. An electrochromic dye comprising at least one of:
    (a) an anodic dye bridged to a non-EC electron acceptor wherein the bridge comprises a first alkyl group and the non-EC electron acceptor being characterized by Hammett Sigma Parameter of at least 0.4;
    (b) a cathodic dye bridged to a non-EC electron donor wherein the bridge comprises a second alkyl group and the said non-EC electron donor characterized by Hammet Sigma Parameter of equal to or less than −0.2.
11. The electrochromic dye as in item 10, wherein the non-EC electron acceptor or the non-EC electron donor is a nanoparticle.
12. An electrochromic dye as in item 11, wherein the nanoparticle is a metal or a metal compound.
13. The electrochromic dye as in item 10, wherein the anodic dye or the cathodic dye comprises one or more of a ferrocene, a phenazine, a thiophene, a phenothiazine, a viologen salt, an anthraquinone, an indandione, a triphenylamine, a dithiafulvenyl, a tetrahydroquinoline, a carbazole and an indoline.
14. The electrochromic dye as in item 13, wherein the first alkyl group or the second alkyl group comprises of 3 to 8 carbon atoms.
15. A pre-formed electrochromic dye macromer structure containing at least two electrochromic dye moieties joined by a linker, containing "σ" links or a combination of "σ" and "π" links wherein the molecular weight of the said dye structure is at least 2000.
16. The dye macromer structure as in item 15, wherein the said macromer is functionalized by incorporating a reactive group.
17. The dye macromer structure as in item 15 or item 16, comprising at least one bridged dye.
18. The dye macromer structure of any one or combination of items 15-17, wherein the reactive group is reacted with other monomers to form a polymeric material.
19. The polymeric material of item 18, wherein the said polymeric material is polyurethane.
20. The dye macromer structure as in any one or combination of items 11-15, wherein the reactive group is selected from at least one of hydroxy, carboxylic, amine, isocyanate, acrylic methacrylic, epoxy, and alkoxy groups.
21. The dye macromer structure as in any one or combination of items 15-20, wherein the dye comprises one or more of ferrocene, phenazine, thiophene, phenothiazine, viologen salt, anthraquinone, indandione, triphenylamine, dithiafulvenyl, tetrahydroquinoline, carbazole and indoline.
22. An electrochromic device, comprising:
    a first substrate with a conductive coating;
    a redox layer in contact with the conductive coating;

wherein the said redox layer comprises the dye macromer of any one or combination of items 15-21.
23. An electrochromic dye comprising at least one of:
   (a) an anodic dye bridged to a non-EC electron acceptor wherein the bridge comprises a first alkyl group and the non-EC electron acceptor being characterized by Hammett Sigma Parameter of at least 0.4;
   (b) a cathodic dye bridged to a non-EC electron donor wherein the bridge comprises a second alkyl group and the said non-EC electron donor characterized by Hammet Sigma Parameter of equal to or less than −0.2.
24. The electrochromic dye as in item 23, wherein the non-EC electron acceptor or the non-EC electron donor is a nanoparticle.
25. An electrochromic dye as in item 24, wherein the nanoparticle is a metal or a metal compound.
26. The electrochromic dye as in any one or combination of items 23-25, wherein the anodic dye or the cathodic dye comprises one or more of ferrocene, phenazine, thiophene, phenothiazine, viologen salt, anthraquinone, indandione, triphenylamine, dithiafulvenyl, tetrahydroquinoline, carbazole and indoline.
27. The electrochromic dye as in any one or combination of items 23-26, wherein the first alkyl group or the second alkyl group comprises of 3 to 8 carbon atoms.
28. The functionalized electrochromic dye as in any one or combination of items 1-9, wherein the first moiety and the second moiety are both electrochromic moieties.
29. The functionalized electrochromic dye of item 28, wherein the first moiety and the second moiety are different electrochromic moieties.
30. The functionalized electrochromic dye of item 28, wherein the electrochromic moieties of the first moiety and the second moiety are the same.

Set B
1. An electrochromic device containing two electrically conductive coatings deposited on two clear substrates and at least one of which is transparent, and the device contains between the two conductors at least a first bridged dye and at least one of (a) a second bridged dye and (b) two other electrochromic materials, wherein the colored state color in the L*a*b* color system are within the bounds such as c* is equal to and less than 15.
2. The electrochromic device as in item 1, wherein the first bridged dye comprises of a ferrocene, a phenazine or a phenothiazine bridged to a viologen, and the other electrochromic materials are selected so that at least one is a cathodic and one is anodic.
3. The electrochromic device as in item 1 or item 2, wherein one of the other electrochromic materials is present as a coating.
4. The electrochromic device as in item 3, wherein the said coating contains metal oxide, electrochromic polymer or at least one functionalized dye which is reacted to the coating matrix.
5. The electrochromic device of item 4, where the metal oxide contains tungsten oxide and nickel oxide.
6. The electrochromic device of item 3 containing an electrolyte, wherein the bridged dye is present in the electrolyte together with an additional electrochromic dye.
7. The electrochromic device of item 6, wherein the bridged dye contains a ferrocene bridged to a viologen.
8. The electrochromic device of item 6, where the additional electrochromic dye is selected from one of a phenazine and a phenothiazine.
9. The electrochromic device of item 2, wherein at least one of the dyes or the electrochromic material in the colored state has an absorption peak in the range of 400 to 480 nm, second one has an absorption peak between 480 and 560 nm and a third one has an absorption peak between 550 and 650 nm.
10. The electrochromic device of item 1, wherein the bridged dye is a cathodic dye bridged to an non-EC electron donor wherein the electron donor is characterized by Hammet Sigma Parameter of equal to or less than −0.2.
11. The electrochromic device of item 1, wherein the bridged dye is an anodic dye bridged to a non-EC electron acceptor wherein the non-EC electron acceptor being characterized by Hammett Sigma Parameter of at least 0.4.
12. An electrochromic device containing two electrically conductive coatings deposited on two clear substrates and at least one of which is transparent, and the device contains between the two conductors at least three dyes, two of which are viologens that color in different spectral regions, and these are present in the device along with at least one anodic dye which colors in a different region as compared to the viologens, wherein the colored state color in the L*a*b* color system are within the bounds such as c* is equal to and less than 15.
13. The electrochromic device as in item 12, where the anodic dyes are selected from phenothiazines and phenazines.
14. The electrochromic device of item 12, wherein one of the viologens is bridged to an anodic electrochromic dye.
15. The electrochromic device of item 12, wherein one of the viologens is bridged to an non-EC electron donor wherein the electron donor is characterized by Hammet Sigma Parameter of equal to or less than −0.2.
16. The electrochromic device of item 12, wherein one of the anodic dyes is bridged to an non-EC electron acceptor wherein the electron acceptor is characterized by Hammet Sigma Parameter of at least 0.4.
17. An electrochromic device containing two electrically conductive coatings deposited on two clear substrates and at least one of which is transparent and the device contains between the two conductors at least one electrochromic coating having at least two electrochromic dyes, wherein the said dyes are functionalized and are reacted with the said electrochromic coating matrix, wherein the colored state color in the L*a*b* color system are within the bounds such as c* is equal to and less than 15.
18. The electrochromic device as in item 17, further containing an additional electrochromic coating.
19. The electrochromic device as in item 18, wherein the additional electrochromic material contains at least one material selected from tungsten oxide and nickel oxide.
20. The electrochromic device as in item 18, wherein the additional electrochromic material is a polymeric coating.

Set C
1. An electrochromic device having two electrically conductive coatings deposited on two clear substrates and at least one of which is transparent, and the device contains an electrolyte between the two conductors wherein the said electrolyte has at least one bridged EC dye and at least one additional EC dye which is not bridged and has anodic or cathodic characteristics.

2. The electrochromic device as in item 1, wherein the first bridged dye comprises of a ferrocene, phenazine or a phenothiazine bridged to a viologen.

3. The electrochromic device as in item 1, wherein an EC coating is present on one of the transparent conductors that contacts the electrolyte.

4. The electrochromic device as in item 3, wherein the said coating contains metal oxide, electrochromic polymer or at least one functionalized dye which is reacted to the coating matrix.

5. The electrochromic device of item 4, where the metal oxide contains at least one of tungsten oxide and nickel oxide.

6. The electrochromic device of item 1, where the additional electrochromic dye is selected from one of a phenazine and a phenothiazine.

7. The electrochromic device of item 1, which colors to a colored state wherein the c* is equal to or less than 15.

8. The electrochromic device which colors to a colored state wherein the c* is less than 20, and a* and b* are between +6 and −20 (minus 20).

9. The electrochromic device of item 1, wherein the bridged dye is a cathodic dye bridged to an non-EC electron donor wherein the electron donor is characterized by Hammet Sigma Parameter of equal to or less than −0.2.

10. The electrochromic device of item 1, wherein the bridged dye is an anodic dye bridged to a non-EC electron acceptor wherein the non-EC electron acceptor being characterized by Hammett Sigma Parameter of at least 0.4.

11. A electrochromic device as in item 6, wherein the phenazine is has the following structure

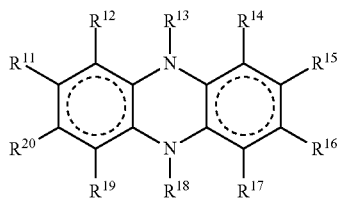

wherein R13 and R18 are C1 to C12 alkyl groups and are the same, and wherein R12, R11, R20 R19, R14, R15, R16 and R17 are all hydrogen.

12. The electrochromic device as in item 6, wherein the phenazine has the following structure

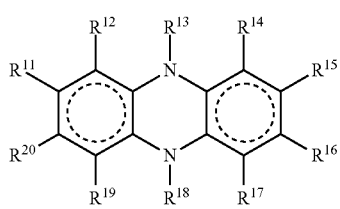

wherein R13 and R18 are C1 to C12 alkyl groups and are the same (e.g., propyl, butyl, isopropyl, tertiary butyl, neopentyl), and where R12, R20 R19, R14, R16 and R17 are all hydrogen; and R11 and R15 are the same and are C1 to C12 linear or branched alkyl groups.

13. The electrochromic device as in item 6, wherein the phenothiazine is described as the following structure

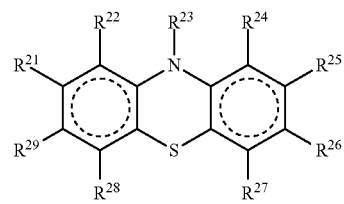

wherein R23 is hydrogen, phenyl or C1 to C12 alkyl groups, and wherein R21, R22, R24, R25, R26, R27, R28 and R29 are all hydrogen.

14. The electrochromic device as in item 6, wherein the phenothiazine is selected from the following structure:

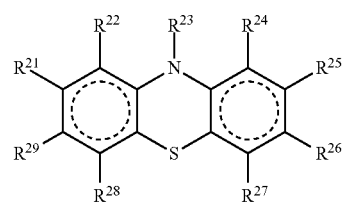

wherein R23 is hydrogen, phenyl or C1 to C12 alkyl; and R21, R22, R24, R25, R27 and R28 are all hydrogen; and R26 and R29 are the same and selected from C1 to C12 linear or branched alkyl groups.

15. An electrochromic device having two electrically conductive coatings deposited on two clear substrates and at least one of which is transparent, and the device contains an electrolyte between the two conductors wherein the said electrolyte has at least the following combination of the dyes:

a) a viologen;

b) a phenazine and c) a phenothiazine, wherein the phenothiazine is selected from the following structure

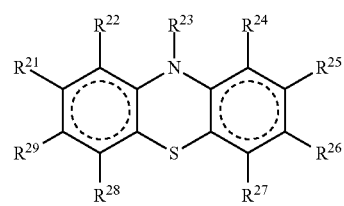

wherein R23 is hydrogen, phenyl or C1 to C12 alkyl groups; and R21, R22, R24, R25, R27 and R28 are all hydrogen; and R29 and R26 are the same and are C1 to C12 linear or branched alkyl groups.

16. The electrochromic device of item 15, wherein the phenazine is selected from the following structure

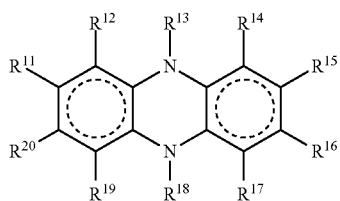

wherein R13 is the same as R18, and these are alkyl groups with C1 to C12 (e.g., methyl, propyl, butyl, isopropyl, tertiary butyl, neo-pentyl), and wherein R12, R20 R19, R14, R16 and R17 are all hydrogen; and R11 and R15 are the same and are C1 to C12 linear or branched alkyl groups.

17. The electrochromic device of item 15, which colors to a colored state wherein
  $c^*$ is equal to or less than 15 or
  $c^*$ is less than 20, and $a^*$ and $b^*$ are between +6 and −20 (minus 20).

18. The electrochromic device having two electrically conductive coatings deposited on two clear substrates and at least one of which is transparent, and the device contains an electrolyte between the two conductors wherein the said electrolyte has at least the following combination of the dyes:
  a) a viologen;
  b) a phenothiazine and
  c) a phenazine, wherein the phenazine is selected from the following structure

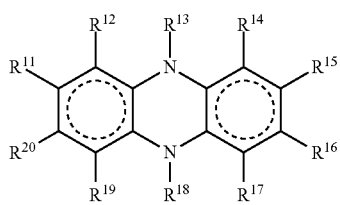

wherein R13 is the same as R18, and these are alkyl groups with C1 to C12 including methyl, propyl, butyl, isopropyl, tertiary butyl, neo-pentyl; and R12, R20 R19, R14, R16 and R17 are all hydrogen; and R11 and R15 are the same and are C1 to C12 linear or branched alkyl groups.

19. The electrochromic device of item 18, wherein the phenothiazine is selected from the following structure:

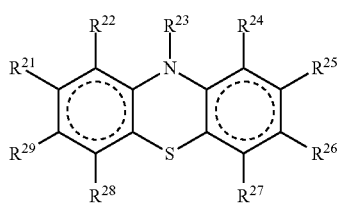

wherein R23 is hydrogen, phenyl or C1 to C12 alkyl; and R21, R22, R24, R25, R27 and R28 are all hydrogen; and R26 and R29 are the same and selected from C1 to C12 linear or branched alkyl groups.

20. The electrochromic device of item 18 or item 19, which colors to a colored state wherein (a) $c^*$ is equal to or less than 15 or (b) $c^*$ is less than 20, and $a^*$ and $b^*$ are between +6 and −20 (minus 20).

21. An electrochromic device having two electrically conductive electrodes and the device contains an electrolyte between the two conductors wherein the said electrolyte has at least two bridged electrochromic dyes.

22. An electrochromic device as in item 21, wherein anions present in the electrolyte are not halogenated.

23. An electrochromic device as in item 21, wherein anions present in the electrolyte are not fluorinated.

The present disclosure also includes the following aspects:

1. An electrochromic device comprising two electrically conductive electrodes and an electrolyte between the two electrically conductive conductors, wherein the electrolyte has at least one electrochromic dye-salt comprising an anion which is not halogenated.
2. The electrochromic device of aspect 1, wherein the electrochromic (EC) dye-salt comprises a viologen salt.
3. The electrochromic device of aspect 2, wherein the viologen salt comprises a viologen covalently bridged to an anodic dye.
4. The electrochromic device of any one or combination of aspects 1-3, wherein the electrolyte further comprises one or more anodic dyes.
5. The electrochromic device of any one or combination of aspects 1-4, further comprising a UV stabilizer.
6. The electrochromic device of any one or combination of aspects 1-5, wherein the anion is a borate.
7. The electrochromic device of aspect 6, wherein the borate anion is bis(oxalate)borate.
8. The electrochromic device of any one or combination of aspects 1-7, wherein at least one of the one or more anodic dyes comprises a ferrocene-containing dye, a phenazine-containing dye, or a phenothiazine-containing dye.
9. The electrochromic device of any one or combination of aspects 1-8, wherein at least one of the one or more anodic dyes comprises a ferrocene-containing dye, a phenazine-containing dye, or a phenothiazine-containing dye
10. The electrochromic device of any one or combination of aspects 1-9, wherein the electrolyte comprises at least one other salt which is not electrochromic.
11. The electrochromic device of aspect 10, wherein the other salt comprises an anion that is non-halogenated.
12. The electrochromic device of any one or combination of aspects 1-11, comprising an electrochromic (EC) coating deposited on one of the electrically conductive electrodes that contacts the electrolyte.
13. The electrochromic device of aspect 12, wherein the EC coating comprises at least one of a metal oxide and an organic EC material.
14. An automotive mirror, building window, or a window of a transportation vehicle, comprising the electrochromic device of any one or combination of aspects 1-13.
15. An electrochromic device having a first electrically conductive coating deposited on a first clear substrate and a second electrically conductive coating deposited on a second substrate, wherein at least one of the first and second electrically conductive coatings is transparent, wherein the first and second substrates are disposed in a parallel configuration with a gap therebetween with the first and second conductive coatings facing each other, wherein the gap contains an electrolyte, wherein the electrolyte has at least one viologen-containing electrochromic dye-salt comprising an anion, wherein the anion is not fluorinated.

16. The electrochromic device of aspect 15, wherein the non-fluorinated anion is bis(oxalate)borate.

17. The electrochromic device of aspect 16, wherein the viologen is bridged to an anodic dye.

18. The electrochromic device of aspects 15 or 16, wherein the electrolyte comprises an anodic dye.

19. An electrochromic device having a first electrically conductive coating deposited on a first clear substrate and a second electrically conductive coating deposited on a second clear substrate, wherein at least one of the first and second electrically conductive coatings is transparent, wherein the first and second clear substrates are disposed in a parallel configuration with a gap therebetween with the first and second conductive coatings facing each other, wherein the gap contains an electrolyte, wherein the electrolyte comprises at least one electrochromic dye-salt, wherein the electrochromic dye-salt comprising an anion and a viologen bridged to an anodic dye, wherein the anion is a borate.

20. The electrochromic device of aspect 19, wherein the anodic dye comprises a ferrocene, a phenazine, or a phenothiazine.

21. The electrochromic device of any one or combination of aspects 19-20, wherein the electrolyte comprises a UV stabilizer.

grade, obtained from Huntsman Chemical, Woodland, Tex.) and the fill holes were sealed using a mechanical solid polymer plug (not soluble in the electrolyte) followed by a glass cap bonded with a UV curing adhesive.

In this example, the cavity was filled with an electrolyte containing 0.025M Li TFSI (lithium bis(trifluoromethane-sulfonyl)imide), 8 wt % PMMA as thickener (Elvacite 2041, obtained from Chempoint (Bellevue, Wash.), 3 weight % UV stabilizer as Uvinul™3035 in propylene carbonate (UPPC grade, obtained from Huntsman Chemical, Woodland, Tex.). In addition, these contained the EC dye compositions as listed below. PT represents phenothiazine, Fc-V represents a bridged dye between ferrocene and viologen, specifically 4,4'-bipyridinium, 1-(4-ferrocenylbutyl)-1'-methyl-, with TFSI anions. There are two TFSI anions for each Fc-V cation. The perimeter of these cavities were sealed and a voltage of 1.2V was applied to the opposing electrodes (transparent conductors) to color these cells. The characteristics of these cells in the bleached (non-colored) state and the colored state in transmission are shown. The depth of coloration is shown by the coloration at 550 nm (photopic eye response) and also the color coordinates along with c* are shown. A smaller value of c* represents more color neutrality and as discussed earlier in different embodiments this should be less than 15, 10 or 5, and the difference between the colored and the bleached states should also be small.

TABLE 1

| EC cell # | Dye 1 and concentration | Dye 2 and concentration | Bleached state | | | | | Colored state | | | | |
|---|---|---|---|---|---|---|---|---|---|---|---|---|
| | | | % T, 550 nm | L* | a* | b* | c* | % T, 550 nm | L* | a* | b* | c* |
| 1 | Fc-V, 0.025 | | 75.2 | 88.7 | −1.64 | 11.2 | 11.3 | 5.9 | 37.4 | −3.9 | −43.6 | 43.7 |
| 2 | PT, 0.2M | | 78.0 | 90.5 | −1.14 | 4.13 | 4.3 | 9.3 | 27.4 | 4.97 | 7.06 | 8.6 |
| 3 | PT, 0.18M | Fc-V, 0.00125M | 76.1 | 89.6 | −1.79 | 6.39 | 6.6 | 10.5 | 30.0 | 3.83 | −0.63 | 3.9 |
| 4 | PT, 0.15M | Fc-V, 0.00625M | 74.4 | 88.6 | −1.84 | 7.04 | 7.3 | 9.8 | 30.8 | 2.06 | −12.1 | 12.3 |

EXAMPLES

Example 1: Neutral Coloring Cell with Blue Coloring Tungsten Oxide

A tungsten oxide coating (containing 30 mole % lithium oxide) was formed using wet chemical method on a 2.3 mm thick TEC™15 substrate. TEC™15 substrates used were clear soda-lime glass with a clear transparent conductive coating from NSG (Toledo, Ohio). The coating thickness was 370 nm. Details of the coating solution composition and its deposition are in U.S. Pat. No. 6,373,618 (see Example 1 of this patent). Several EC cells were formed using tungsten oxide coated substrates on one side with another 2.3 mm thick TEC™15 substrate. In each case a cavity of uniform thickness of 300 μm thick between the two substrates was formed with the two conductive sides on the substrate facing each other. The size of the substrates was about 9 cm×13 cm. The cavity was sealed using an epoxy adhesive at the perimeter (~3 mm wide, and tungsten oxide coating was removed from this perimeter region) and had glass-bead spacers to achieve the 300 μm separation. One of the substrates had two holes near the diagonal corners for filling the cavity with the electrolyte. This cavity was filled with an electrolyte containing propylene carbonate (UPPC This example shows that though all cells used the same tungsten oxide coatings, and the EC cells 2, 3 and 4 show neutral color. EC Cell 1 colors to a deep blue color. The most neutral coloring EC cell 3 uses a combination of dyes as taught herein. The data also show that the relative concentration of dyes is important to obtain a more neutral cell.

Example 2: Color of EC Cells Containing Mixture of EC Dyes

Several EC cells were formed using two 2.3 mm thick TEC™15 substrates. In each case a cavity of 300 μm thick was formed with the two conductive side facing each other. More details on cell fabrication and substrate sizes are in Example 1 (please note there was no tungsten oxide coating in these cells). These cavities were filled with an electrolyte containing propylene carbonate (UPPC grade, obtained from Huntsman Chemical, Woodland, Tex.) along with the dyes and other additives as listed below. In addition, these cells were filled with the following different electrolytes, where the difference was in the dye composition. Cell A had 0.025M of phenothiazine+0.025M ethyl viologen diperchlorate; Cell B had 0.025M 10-ethyl-3,7-dimethyl-10H-phenothiazine+0.025M ethyl viologen diperchlorate, Cell C had 0.025M diisopropyl phenazine+0.025M ethyl viologen diperchlorate and Cell D had 0.025M Fc-V bridged dye (specifically 4,4'-bipyridinium, 1-(4-ferrocenylbutyl)-1'-methyl-, with TFSI anions). Structure of 10-ethyl-3,7-dimethyl-10H-phenothiazine is shown in FIG. 4c, where R23 is ethyl, R26 and R29 are methyl and 21, R22, R24, R25, R27 and R28 are all hydrogen; and diisopropyl phenazine is shown in FIG. 4b where R13 and R18 are isopropyl groups and other substituents are hydrogen.

Figure 11:
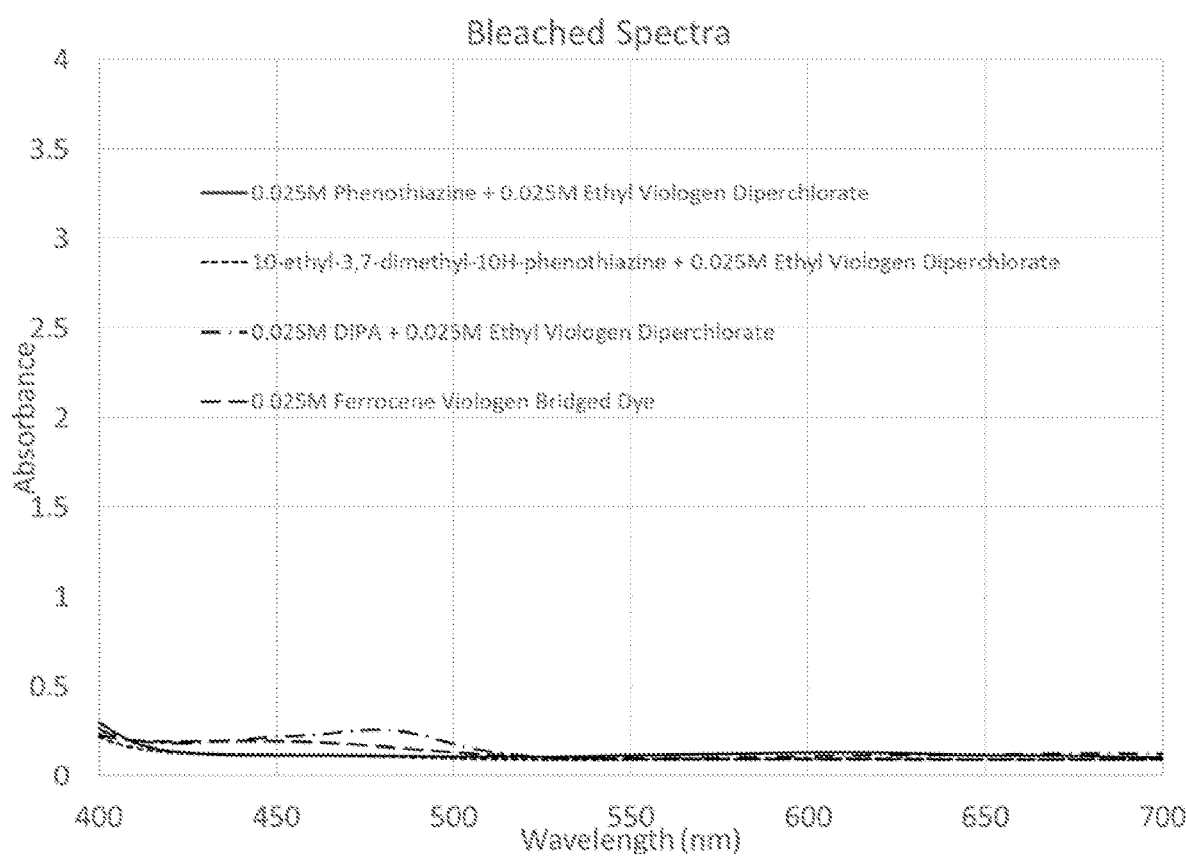
FIG. 11: shows bleached spectrum of several EC cells with different dye compositions.
Figure 12:
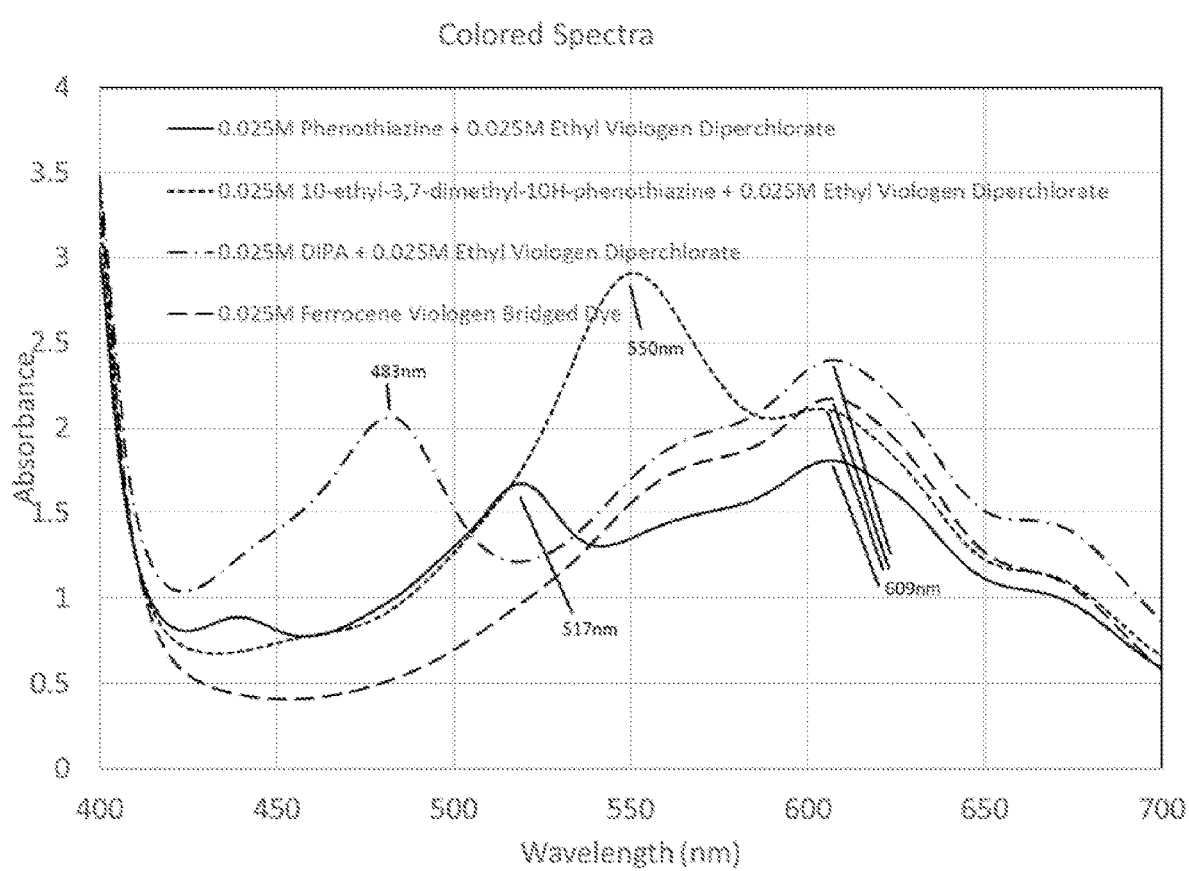
FIG. 12 shows colored spectrum of several EC cells with different dye compositions.

The spectra of these four cells in the colored and the bleached states is shown in FIGS. 11 and 12, respectively. The bleached states of all these cells show low absorbance. The absorbance of these cells in the colored state are shown. In the colored state, the major peaks for each cell are marked. The viologen peaks in all these cells are at almost similar wavelengths of 609 nm. The peaks from diisopropyl phenazine, phenothiazine, 10-ethyl-3,7-dimethyl-10H-phenothiazine are shown respectively at 483, 517 and at 550 nm. An EC cell with dye composition and same electrolyte thickness as Cell D was colored by applying a potential of 1.3V. The coloration results are provided in Table 2. As could be predicted from the spectrum that in the colored state the transmission of the blue wavelengths is high and thus results in a large negative b* value and hence the c* is also large.

TABLE 2

| Bleached state | | | | | Colored state | | | | |
|---|---|---|---|---|---|---|---|---|---|
| % T, 550 nm | L* | a* | b* | c* | % T, 550 nm | L* | a* | b* | c* |
| 79.2 | 89.7 | −1.79 | 12.9 | 13 | 5.5 | 39.6 | −3.9 | −46.7 | 46.8 |

Table 3 provides the results of cyclic voltammetry of the dyes (at scan rates of 20 mV/s) used in Table 4 to fabricate various EC devices by mixing dyes. The structure of 5,10 dimethyldihydrophenazine is shown in FIG. 4b where R13 and R18 are methyl groups and all other "R" groups are hydrogen. In this table, E1 is the position of the first oxidation peak and E2 is the peak of the second oxidation peak. For example the difference in the oxidation peaks of 10-ethyl-3,7-dimethyl-10H-phenothiazine and diisopropylphenazine is 0.38V (0.23−(−0.15)). Furthermore, the first oxidation peak of 10-ethyl-3,7-dimethyl-10H-phenothiazine and of diisopropylphenazine are higher than the second oxidation peak of any of these materials, and this difference is 0.55-0.23=0.22V.

TABLE 3

| Dye | E1 (V) | E2 (V) |
|---|---|---|
| 10-ethyl-3,7-dimethyl-10H-phenothiazine | 0.23 | 0.92 |
| Phenothiazine | 0.26 | 0.71 |
| 5,10,Diisopropylphenazine | −0.15 | 0.55 |
| 5,10 dimethyldihydrophenazine | −0.13 | 0.57 |

To reduce the blue color and to reduce c*, additional cells were prepared with specific dye combinations and concentrations as in the Table 4 below. The perimeter of these cavities were sealed and a voltage of 1.3V was applied to the opposing electrodes (transparent conductors) to color these cells. The characteristics of these cells in the colored state in transmission are shown, the % transmission at 550 nm in the colored state for these cells A, B and C was respectively 20, 9.4 and 4.7%. The color coordinates along with the c* is shown. Smaller value of c* represents more color neutrality and as discussed earlier.

TABLE 4

| Sample (Cell) | Dye | Molarity in the electrolyte | L* | a* | b* | c* |
|---|---|---|---|---|---|---|
| E | Ethyl Viologen Diperchlorate | 0.0254 | 38.6 | −9.2 | −34.2 | 38.6 |
| | 10-ethyl-3,7-dimethyl-10H-phenothiazine | 0.0254 | | | | |
| | Bridged Dye (Fc-V) | 0.0124 | | | | |
| F | Ethyl Viologen Diperchlorate | 0.0249 | 18.0 | −7.4 | −13.7 | 15.6 |
| | 10-ethyl-3,7-dimethyl-10H-phenothiazine | 0.0249 | | | | |
| | Diisopropylphenazine | 0.0188 | | | | |
| G | Ethyl Viologen Diperchlorate | 0.0249 | 27.7 | −12.1 | −11.7 | 16.8 |
| | Phenothiazine | 0.0249 | | | | |
| | Diisopropylphenazine | 0.0188 | | | | |

For cell E three dyes were selected, however, as seen from FIG. 11, the coloration peak of Fc-V almost coincides with that of ethyl viologen diperchlorate (since the coloration provided by ferrocene is very mild, and is not considered of much of a contributor to the color). Although there are three dyes but amongst them there are only two absorption peaks, one at 550 nm and the other at 609 nm. Thus, this cell colors to a blue color which is also seen from a large negative b* value of −38.6 but is reduced from the cell in Table 2. The spectrum in FIG. 11 shows that with these two dyes there is a large transmitting window from about 400 to about 475 nm. In another cell using the same dyes (not reported in the Table 2), the same molarity was used for ethyl viologen diperchlorate and 10-ethyl-3,7-dimethyl-10H-phenothiazine, however, the concentration of the bridged dye Fc-V was reduced to 0.0052M. These cells colored to bluer state where L*, a*, b* were respectively 27.3, 23.5 and −50.3 (minus 50.3) with c* being 55.5. This also demonstrates the role of concentration, since electrochemical dyes have different activation potentials (as is generally determined from cyclic voltammetry), different diffusion characteristics which makes these activation potentials narrower (sharp) or distributed over a broader range. Further, depending on the voltage used to power the cells different amounts of the dyes are activated relative to their concentrations. In some cases, dyes may also interact and influence the activation potentials of each other. Thus, the concentrations for a given set of dyes is optimized based on the desired color at specific activation potentials, and also the impact of other additives that are usually present in the system including salts, UV stabilizers, thickeners (viscosity modifiers) and monomers and catalysts used for those systems where the liquid electrolyte formulation is polymerized to a solid after placing in the cell cavity. These additives are also to be checked for each system of dyes for adverse effects on electrochromic properties and/or durability.

In Cell F instead of adding the bridged dye DIPA (diisopropyl phenazine) was added which has an absorption peak at 483 nm. For these concentrations, the c* decreased to 15.6 and moved it to more desirable color of blue-gray. For this cell, transmission at 550 nm was 1.9%. In another cell with the same dye composition as in Cell F, when a UV stabilizer of Uvinul™ 3035 was added in an amount of 3 weight % of the electrolyte the coloration (in the colored state) was similar where the transmission at 550 nm was 2.3% and c* value was 15.9. In another cell with the same dye composition lithium perchlorate was added to the electrolyte in a concentration of 0.025M, for this cell the coloration (in the colored state) was similar where % transmission in the colored state was 2.1% and c* was 15.4. In Cell G 10-ethyl-3,7-dimethyl-10H-phenothiazine was substituted by phenothiazine, this cell also shows a decrease in c* as compared to Cell E and has a greyish blue-green color in the colored state.

Figure 13:
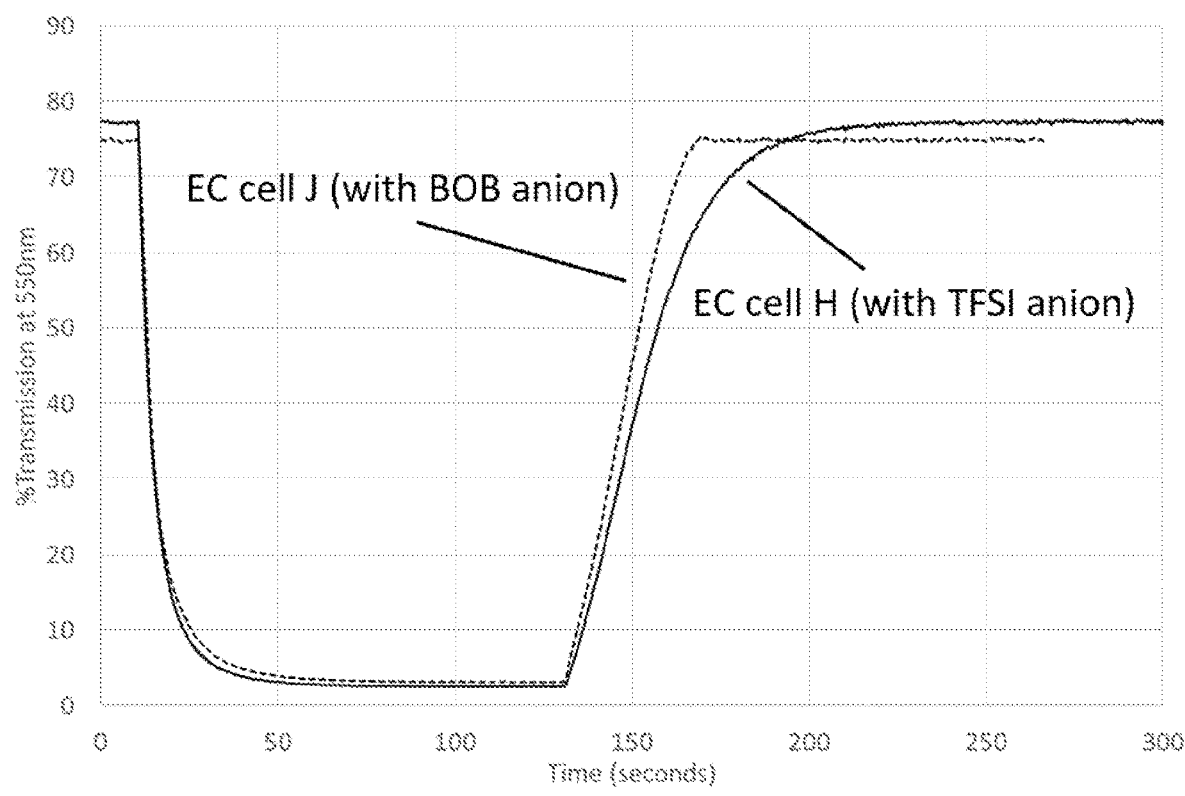
FIG. 13 shows the kinetic traces of an EC cell with the halogenated ions compared to an EC cell without the halogenated ions.
Figure 14:
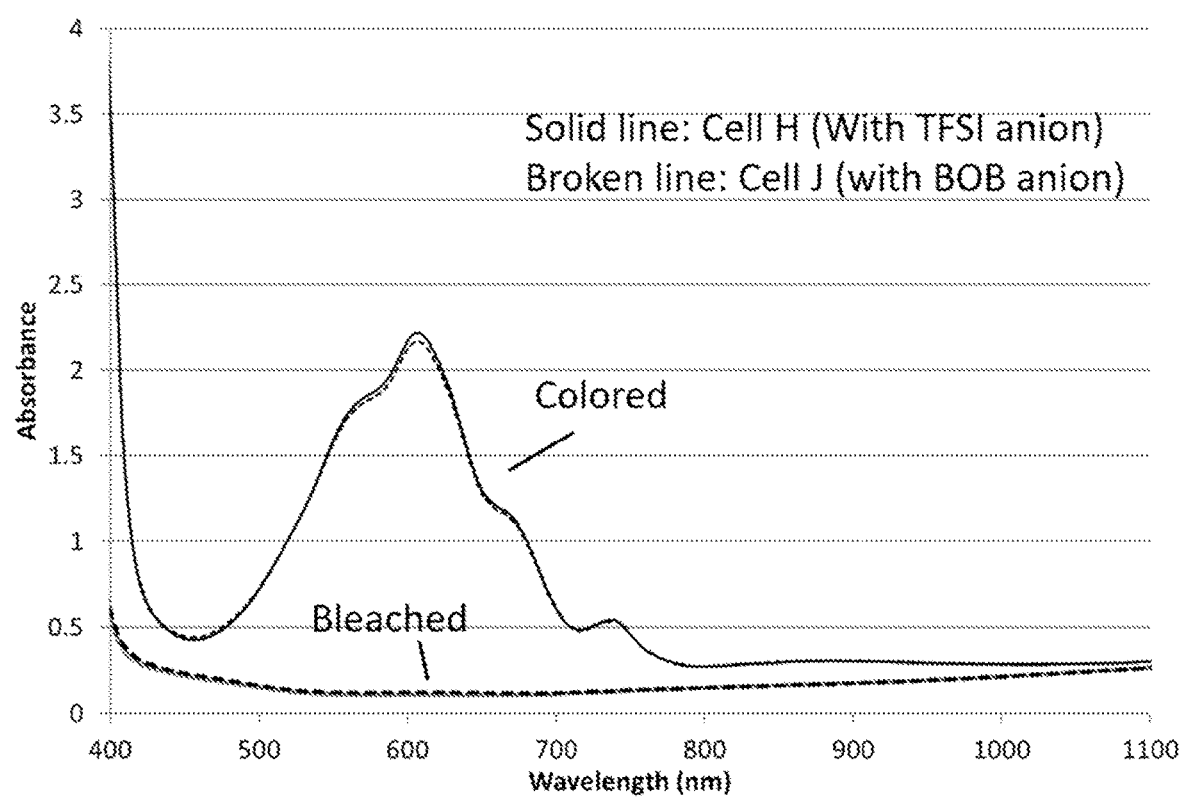
FIG. 14 shows the optical absorption spectra of an EC cell with the halogenated ions compared to an EC cell without the halogenated ions.

Example 3: Performance of EC Cell with Non-Halogenated Anion and its Comparison with a Halogenated Anion Cell Two EC cells were made using low haze TEC7 substrates (conductively coated glass obtained from NSG, Toledo, Ohio). Details of cell assembly are in Example 1. Cell-H was filled with 0.025M LiTFSI and 0.025M Fc-V TFSI (see Example 1 for a description of Fc-V bridged dye), along with a UV stabilizer, all dissolved in propylene carbonate (and molarities based on propylene carbonate). Thus, Cell-H had halogenated anions which have high durability. Cell J was similarly filled with 0.025M LiBOB and 0.025M Fc-V BOB along with the same UV stabilizer in propylene carbonate. Thus, Cell J did not have any halogenated anions. Both of these cells were colored for characterization at room temperature by applying 1.3 V across the opposing electrodes, to bleach (i.e., to go to the clear state) the two opposing electrodes were electrically shorted. The kinetic traces of these cells after cycling for 2,000 cycles at 90° C. (see Table 5 for more details) are shown in FIG. 13. The optical absorption spectra of these cells when compared in either the colored or the bleached states were almost identical between 400 nm to 2,000 nm as shown in FIG. 14. The cycling at 90° C. was conducted using powering conditions to ensure that the center of the cell reached at least a contrast ratio of 6:1 at 550 nm (bleached state transmission: colored state transmission). The cycling voltage at this temperature was 0.9V to color (applied for 30 s) and bleaching was done by shorting the cell for 30 s. The other properties of these cells are shown in Table 5. The data in Table 5 is the results from characterizing the EC cells at room temperature where the coloring voltage was 1.3V and for bleach the two electrodes were shorted. These results are for both of the cells before and after cycling 2,000 times at 90° C.

TABLE 6

Changes in EC cell characteristics after cycling at 90° C. for 2,000 cycles (changes measured at 550 nm, data from Table 5)

| Cell # | % change, coloration rate | % change, bleach rate | % Change in Bleached % T | % Change in Colored % T |
|---|---|---|---|---|
| Cell H | −7% | −3% | 0.41% | 2.8% |
| Cell J | −6% | 7% | 0.7% | −23% |

As seen from the above table, the magnitude of changes in coloration and bleach times, and their transmissions in the colored and the bleached states are within the durability constraints for both the EC cells, and the data shows that the non-halogenated cell (Cell J) has high durability when compared with the halogenated cell (Cell H). The discussion, description, examples and embodiments presented within this disclosure are provided for clarity and understanding. A variety of materials and configurations are presented, but there are a variety of methods, configurations and materials that may be used to produce the same results.

The invention claimed is:

1. An electrochromic device comprising two electrically conductive electrodes and an electrolyte between the two electrically conductive electrodes, wherein the electrolyte has no added halogenated compounds and contains at least one electrochromic dye.

2. The electrochromic device of claim 1, wherein the electrochromic (EC) dye is a viologen salt.

3. The electrochromic device of claim 2, wherein the viologen salt comprises a viologen covalently bridged to an anodic dye.

4. The electrochromic device of claim 3 wherein the anodic dye comprises a ferrocene, a phenazine, or a phenothiazine.

5. The electrochromic device of claim 2, wherein the viologen salt comprises a borate.

6. The electrochromic device of claim 5, wherein the borate is bis(oxalate) borate.

TABLE 5

| Cell Number (Type) | Colored | | | | Bleached | | | | Time to color, s | Time to bleach, s |
|---|---|---|---|---|---|---|---|---|---|---|
| | % T at 550 nm | L* | a* | b* | % T at 550 nm | L* | a* | b* | | |
| Prior to cycling as below | | | | | | | | | | |
| Cell H (w/ halogenated anions) | 2.8 | 34 | 1.5 | −52 | 77.7 | 89.7 | −2.3 | 12.4 | 7.5 | 35 |
| Cell J (w/o halogenated anions) | 2.8 | 33 | 1.3 | −51 | 75.7 | 88.8 | −2.9 | 13.3 | 8.00 | 28.5 |
| After cycling 2,000 times at 90° C. | | | | | | | | | | |
| Cell H (w/ halogenated anions) | 2.8 | 33 | 1.7 | −51 | 77.8 | 89.6 | −2.5 | 12.8 | 8.00 | 36 |
| Cell J (w/o halogenated anions) | 3.5 | 35 | −1 | −49 | 75.1 | 88.5 | −3.1 | 13.1 | 8.50 | 26.5 |

The changes in the bleached state and the colored state (transmission at 550 nm) for both the cells before and after cycling at 90° C. were calculated from the data in Table 5 and are shown in Table 6. This table also lists the changes in coloration and bleaching rates using the data from Table 5.

7. The electrochromic device of claim 2, wherein the viologen salt is not fluorinated.

8. The electrochromic device of claim 1, wherein the electrolyte further comprises one or more anodic dyes.

9. The electrochromic device of claim 8, wherein at least one of the one or more anodic dyes comprises a ferrocene, a phenazine, or a phenothiazine.

10. The electrochromic device of claim 1, further comprising a UV stabilizer.

11. The electrochromic device of claim 1, wherein the electrolyte comprises at least one other salt which is not electrochromic.

12. The electrochromic device of claim 11, wherein the other salt comprises an anion that is non-halogenated.

13. The electrochromic device of claim 1, comprising an electrochromic (EC) coating deposited on one of the electrically conductive electrodes that contacts the electrolyte.

14. The electrochromic device of claim 13, wherein the EC coating comprises at least one of a metal oxide and an organic EC material.

15. The electrochromic device of claim 1, wherein the electrochromic device comprises two substrates having the electrically conductive electrodes on each of the two substrates.

16. An automotive mirror, building window, or a window of a transportation vehicle, comprising the electrochromic device of claim 1.

17. An electrochromic device comprising two electrically conductive electrodes and an electrolyte between the two electrically conductive electrodes, wherein the electrolyte has no added fluorinated compounds and contains at least one electrochromic dye.

18. The electrochromic device of claim 17, wherein the two electrically conductive electrodes are in a parallel configuration with a gap therebetween and sealed at the perimeter such that the electrolyte fills the gap and contacts the two electrically conductive electrodes.

19. The electrochromic device of claim 17, wherein the two electrically conductive electrodes comprise at least one of indium-tin oxide and aluminum-doped zinc oxide.

20. The electrochromic device of claim 17, wherein the at least one electrochromic dye comprises at least one of phenazine, ferrocene, phenothiazine, and a viologen.

21. The electrochromic device of claim 17, wherein the at least one electrochromic dye comprises at least one electrochromic viologen dye, wherein an anion of the viologen dye is bis(oxalate) borate.

22. The electrochromic device of claim 21, comprising at least one additional electrochromic dye.

23. The electrochromic device of claim 22, wherein the additional electrochromic dye comprises at least one of phenazine, ferrocene, and phenothiazine.

24. An electrochromic device comprising two electrically conductive electrodes and an electrolyte between the two electrically conductive electrodes, wherein the electrolyte comprises a dye salt, wherein an anion of the dye salt is not fluorinated.

25. The electrochromic device of claim 24 wherein the dye is a viologen dye.

26. The electrochromic devices of claim 24, wherein the anion is bis(oxalate) borate.

* * * * *